US012412362B2

(12) United States Patent
Tal et al.

(10) Patent No.: US 12,412,362 B2
(45) Date of Patent: Sep. 9, 2025

(54) SYSTEM AND METHOD FOR DETECTING AND TRANSMITTING INCIDENTS OF INTEREST OF A ROADWAY TO A REMOTE SERVER

(71) Applicant: Visual Defence Inc., Richmond Hill (CA)

(72) Inventors: Royi Tal, Richmond Hill (CA); Thomas Bakonyi, Richmond Hill (CA); Omri Artman, Richmond Hill (CA); Redenthor Ibana, Richmond Hill (CA); David Curry, Richmond Hill (CA)

(73) Assignee: Visual Defence Inc., Richmond Hill (CA)

( * ) Notice: Subject to any disclaimer, the term of this patent is extended or adjusted under 35 U.S.C. 154(b) by 505 days.

(21) Appl. No.: 17/972,525

(22) Filed: Oct. 24, 2022

(65) Prior Publication Data

US 2023/0050849 A1 Feb. 16, 2023

Related U.S. Application Data

(62) Division of application No. 16/930,070, filed on Jul. 15, 2020, now Pat. No. 11,481,991.

(51) Int. Cl.
*G06V 10/25* (2022.01)
*G06T 5/70* (2024.01)
(Continued)

(52) U.S. Cl.
CPC ............... *G06V 10/25* (2022.01); *G06T 5/70* (2024.01); *G06T 7/70* (2017.01); *G06V 20/58* (2022.01);
(Continued)

(58) Field of Classification Search
CPC .......... G06V 10/25; G06V 20/58; G06T 7/70; G06T 5/002
See application file for complete search history.

(56) References Cited

U.S. PATENT DOCUMENTS 6,282,362 B1 8/2001 Murphy
11,481,991 B2 * 10/2022 Tal ..................... G06V 20/58
(Continued)

FOREIGN PATENT DOCUMENTS

EP 3618012 A1 3/2020

OTHER PUBLICATIONS

Applicant: Visual Defence Inc.; "A System and Method for Detecting and Transmitting Incidents of Interest of a Roadway to a Remote Server", European Application No. 21185548; Extended European Search Report; Nov. 12, 2021; 11 pgs.
(Continued)

*Primary Examiner* — Myron Wyche
(74) *Attorney, Agent, or Firm* — Procopio, Cory, Hargreaves & Savitch LLP

(57) ABSTRACT

System and methods for automated incident identification and reporting while operating a vehicle on the road using a device. The device identifies incidents using artificial intelligence neural networks trained to detect, classify, segment, and/or extract other information pertaining to objects of interest representing incidents. Additionally, a system and method for further storing, transmitting, processing, organizing and accessing the information graphically with respect to incident type, location, date and time during operation of the vehicle along the road.

20 Claims, 12 Drawing Sheets

(51) Int. Cl.
    *G06T 7/70*     (2017.01)
    *G06V 20/58*    (2022.01)
(52) U.S. Cl.
    CPC .............. *G06T 2207/20084* (2013.01); *G06T 2207/30261* (2013.01)

(56) References Cited

U.S. PATENT DOCUMENTS

| | | |
|---|---|---|
| 2004/0218052 A1 | 11/2004 | DiDomenico |
| 2017/0200061 A1 | 7/2017 | Julian et al. |
| 2018/0330526 A1 | 11/2018 | Corcoran |
| 2019/0034735 A1 | 1/2019 | Cuban et al. |
| 2020/0394411 A1 | 12/2020 | Dahlberg |

OTHER PUBLICATIONS

Subhasisdas, et al.; "Traffic Sign Detection Mobile App CS 231M-Project", Jun. 30, 2014, pp. 1-2 XP055857826, Retrieved from the Internet: URL: https://web.stanford.edu/class/cs231m/spring-2014/proposals/sdmm.pdf [retrieved Nov. 4, 2021].

Tung Yu-Chih, et al,; "Use of Phone Sensors to Enhance Distracted Pedestrians' Safety", IEEE Transactions on Mobile Computing., vol. 17, No. 6, Jun. 1, 2018, pp. 1469-1482, XP055857868, US ISSN: 1536-1233, DOI: 10.1109/TMC.2017.2764909, Retrieved from the Internet: URL: https://yctung.github.io/files/publication/tmc17-bumpalert.pdf.

* cited by examiner

Figure 2.
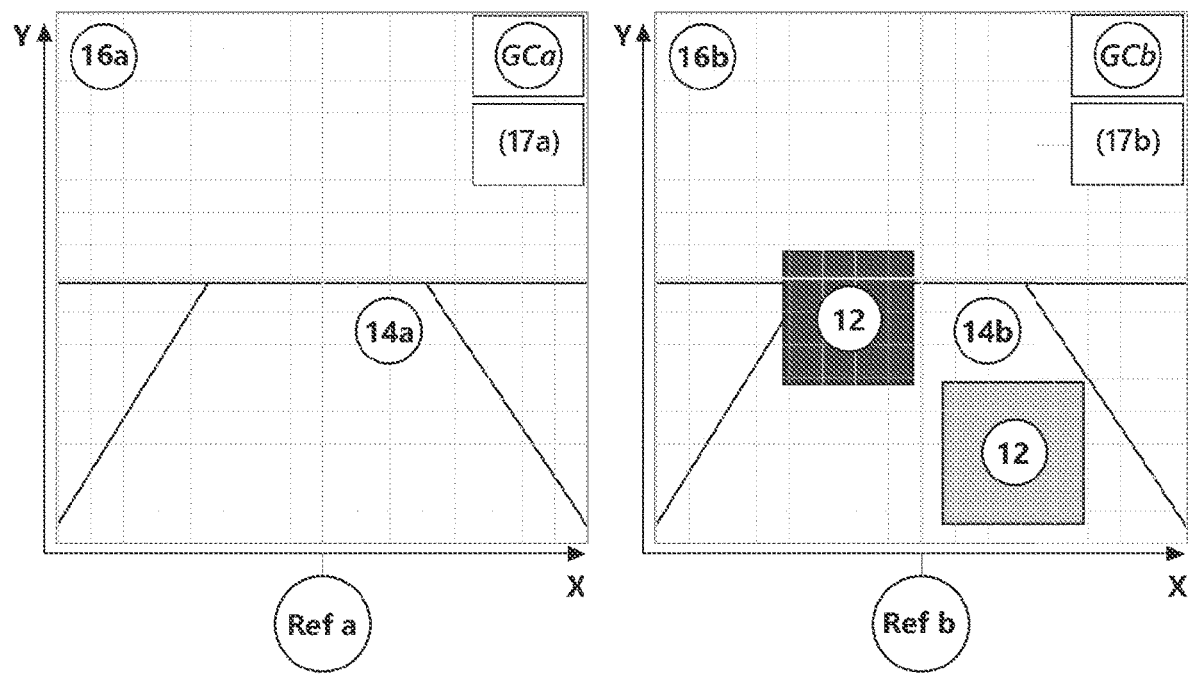
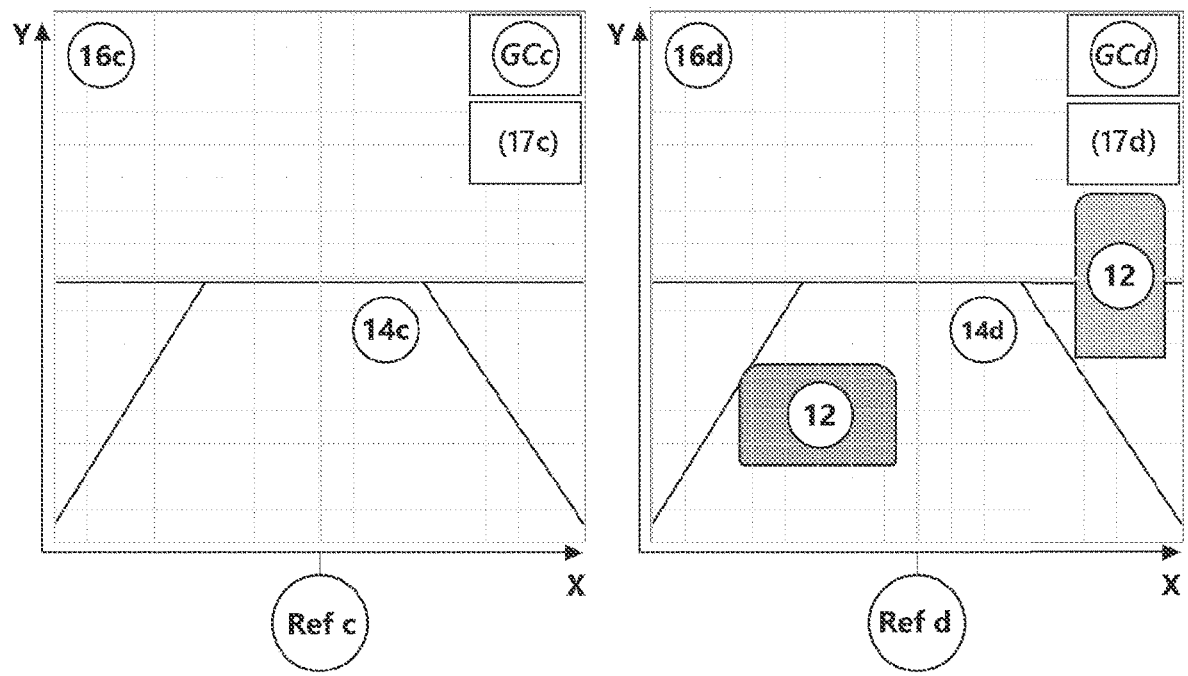

Figure 6. Privacy & Security

Figure 7. Sensors

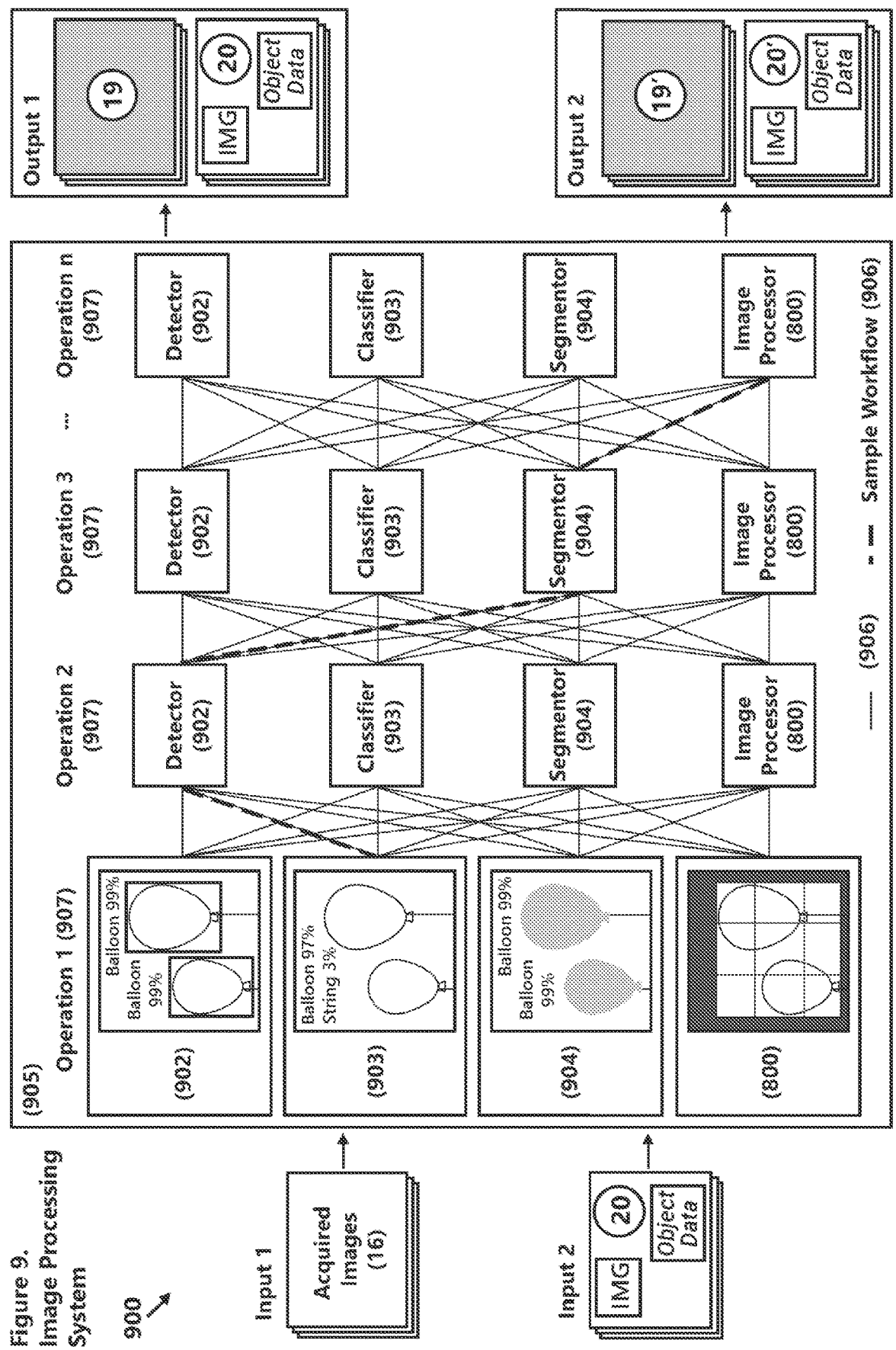

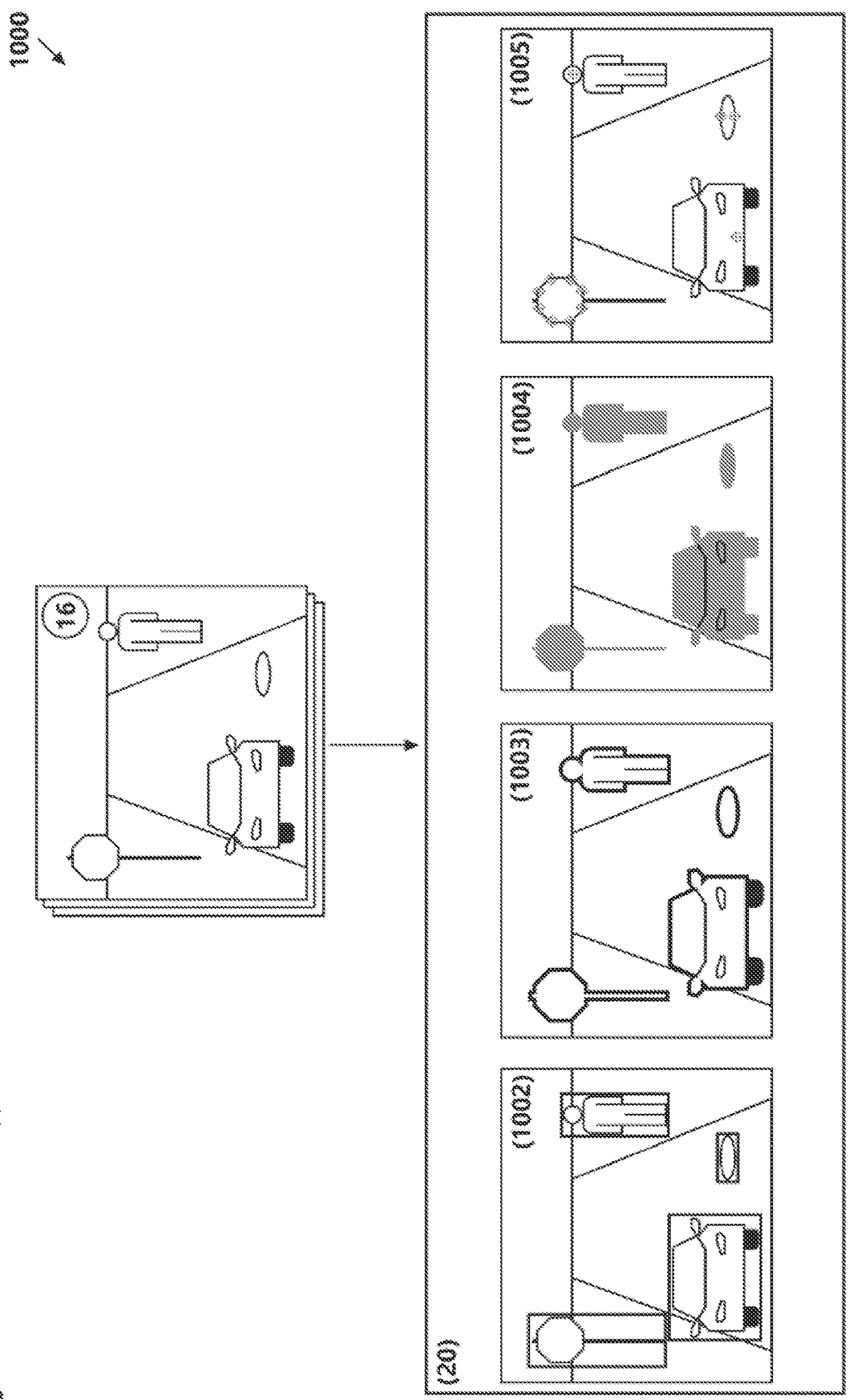
Figure 10. Neural Network(s) Inference Results

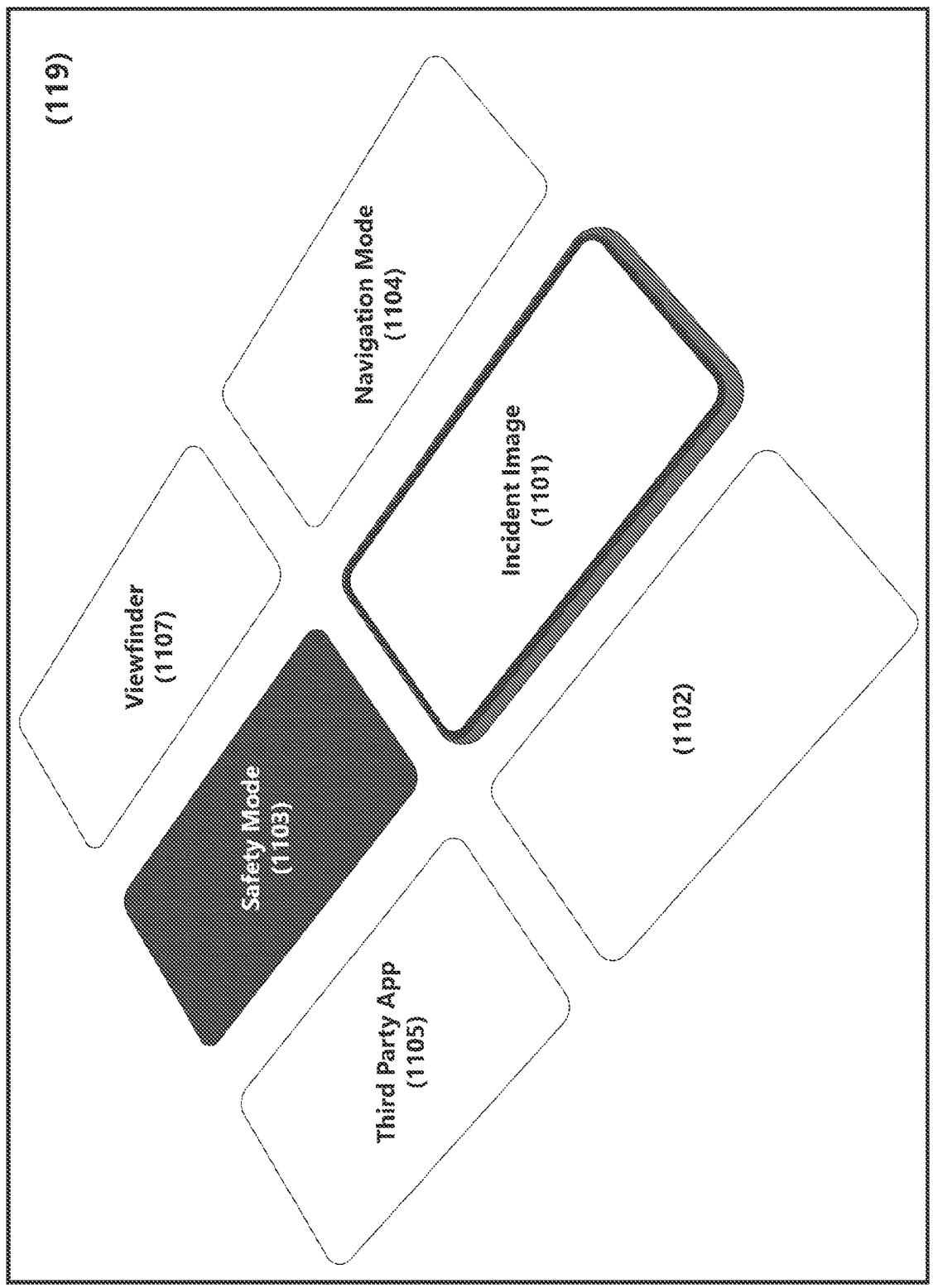
Figure 11. Display

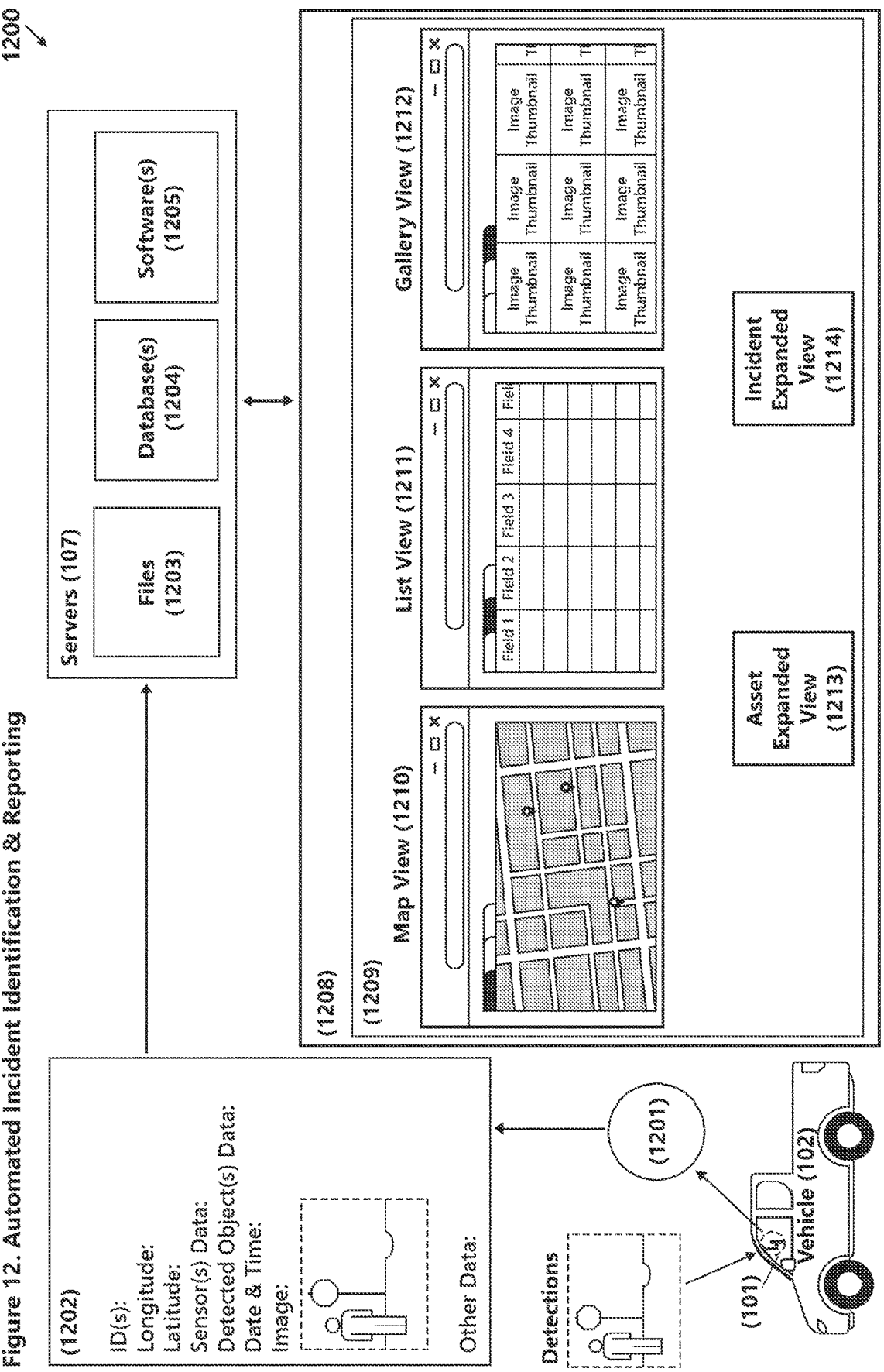
Figure 12. Automated Incident Identification & Reporting

SYSTEM AND METHOD FOR DETECTING AND TRANSMITTING INCIDENTS OF INTEREST OF A ROADWAY TO A REMOTE SERVER

CROSS-REFERENCE TO RELATED APPLICATIONS

This application is a Divisional to U.S. patent application Ser. No. 16/930,070, filed on Jul. 15, 2020, all the contents of which are incorporated herein by reference.

FIELD

The present invention is related to image processing for road related incidents.

BACKGROUND

Although many technologies exist for surveying the roads, oftentimes the costs and constraints make it less appealing for practical use. Many solutions require modifications to the vehicle, costly attachments, computers and training to use. Usually these technologies specialize in surveying a single component of road condition. To detect the full spectrum of incidents expected to keep roads maintained, the most common and effective practice is still largely manual. Surveyors drive vehicles down roads and stop their vehicle when they find an object of interest. They take a picture, and then note down the incident details to revisit. This is a slow and costly method, oftentimes leaving a backlog of roads that are overdue for reassessment. As municipalities grow, it becomes harder and harder to stay on top of all the incidents in the system.

Municipalities occasionally outsource road assessment to companies which utilize specialized vehicles employing a wide array of sensors, including cameras, thermal, vibration, radar and laser. While providing a greater level of detail, a specialized vehicle is required to complete the task. The vehicle sensors require extensive calibration, and the processing of the data requires specialized systems and knowledge to produce a report. The costs are extensive, and therefore, such assessments are typically done periodically, where the period duration typically ranges from one year to ten years.

While there have been occasional instances of applications aimed at identifying road damage in video or images, such processes are typically done by first acquiring a data set (in the form of video and geo-positioning data), and then uploading the data to a specialized server where it is processed. The process is cumbersome as often the dataset is too large to transmit over cellular networks. Thus, disadvantageously, current systems must rely upon access to the complete image dataset only once the vehicle has returned to the image processing facility.

SUMMARY

It is an object of the present invention to provide an image acquisition system and/or method to obviate or mitigate at least one of the above presented disadvantages.

Current technologies for surveying roads are extremely costly, requiring complex installation of specialized sensors on a vehicle. They require extensive training and experience to operate and are typically limited only to analysis of pavement condition. Due to the high cost and limited capabilities of the available technologies, municipalities are currently relying on manual inspection to cover the detection of all road related incidents. Further, existing on board imaging systems used for navigation of a vehicle are not optimized for acquiring appropriate images containing objects of interest with respect to a road surface. As such, using a separate device containing a camera that is mounted to the vehicle, in addition to any onboard vehicle imaging systems (used for vehicle navigation), is desired.

Municipalities send their maintenance workers to drive the service vehicles on roads where they must visually locate road related concerns while on patrol or a service call. When workers spot a potential concern they are required to pull over and get off the vehicle to closely investigate the issue and manually initiate an incident or a work order using whatever system they have in place. It may be logged by pen and paper or utilizing a computerized tablet or smart phone.

Getting off the vehicle for each detected issue is not only time consuming but also put workers in a dangerous situation. Contrary to the current technologies available and the method that is implemented to detect road related incidents, the system provided here is capable of automated identification and reporting of a wide variety of road related incidents (e.g. various types of pavement damage and degradation, road sign damage, road debris, obstructions and other incidents visible from inside of a vehicle).

The system comprising of: device—a mobile computing device such as smartphone, or embedded computer system with built in or peripheral camera(s) and application utilizing neural network(s) and machine learning work together with server(s) that process and store data received from single or multiple devices, serve as gateway to users via web access and present data to users in a meaningful and intuitive manner.

The device is easy to install, can be easily moved to different vehicles and the user does not require training to operate the device. Once the device is started, the device can operate with minimal human intervention.

The user can have a single device mounted on a vehicle or deploy multiple devices deployed on their fleet to have access to an up-to-date insight of their roads. The data created from the incident detection can be used to automate the opening of work orders which helps streamline the process of resolving incidents.

A first aspect provided is a system for capturing digital images containing objects of interest along a first section of a roadway and for transmitting object data pertaining to the objects of interest over a communications network to a server, the server located remotely from the system, the system comprising: a device having: a camera for obtaining the digital images; at least one sensor for acquiring sensor data pertaining to the objects of interest contained in the digital images; and a memory and processor for executing image processing instructions for processing the digital images in order to generate the object data, the object data including the sensor information and the resultant data representing the objects of interest; and a mounting component for mounting the device to a vehicle, the vehicle for travelling along the roadway during operation of the camera; and a network interface for sending the object data over the communications network to the server during operation of the vehicle on the roadway.

A further aspect provided is a method for capturing digital images containing objects of interest along a first section of a roadway and for transmitting object data pertaining to the objects of interest over a communications network to a server, the server located remotely from the system, the method stored instructions for execution by a processor:

obtaining the digital images by a camera mounted by a mounting component to a vehicle, the vehicle for travelling along the roadway during operation of the camera; acquiring sensor data pertaining to the objects of interest contained in the digital images; executing image processing instructions for processing the digital images in order to generate the object data, the object data including the sensor information and the resultant data representing the objects of interest; and sending the object data over the communications network to the server during operation of the vehicle on the roadway.

A further aspect provided is a system for collecting, processing, discarding, storing, transmitting, and disseminating data, the data includes information captured from one or more cameras and one or more sensors mounted in a vehicle, and generated object data and generated resultant data, the system comprising: at least one device per vehicle, the at least one device having: a housing; one or more processors for executing software instructions; one or more memory components; one or more network interfaces; the one or more sensors for acquiring sensor data; the one or more cameras for obtaining digital images; a mounting component for mounting the housing of the at least one device to the vehicle; and the software instructions, including image processing operations and related software instructions to discard image data, generate the object data and the resultant data; and one or more servers, communicating with the at least one device over a communications network, the at least one device mounted in one or more vehicles.

A further aspect provided is a method for collecting, processing, discarding, storing, transmitting, and disseminating digital data, the data includes information captured from a device, a camera and a sensor mounted in a vehicle, and generated object data and generated resultant data.

A further aspect provided is a system for collecting, processing, discarding, storing, transmitting, and disseminating data, said data includes data captured from camera(s) and sensor(s) mounted in a vehicle, and generated object data and resultant data, the system comprising of: one or more devices per vehicle, having: a housing; one or more processors for executing software instructions; one or more memory components; one or more network interfaces; one or more sensors for acquiring sensor data; one or more cameras for obtaining digital images; a mounting component for mounting the housing of the device to a vehicle; and software instructions, including image processing operations and related software instructions to discard image data, generate object data and resultant data; and one or more servers, communicating with one or more devices, mounted in one or more vehicles.

A further aspect provided is a method for collecting, processing, discarding, storing, transmitting, and disseminating digital data, said data includes data captured from device, camera(s) and sensor(s) mounted in a vehicle, and generated object data and resultant data.

BRIEF DESCRIPTION OF THE DRAWINGS

Exemplary embodiments of the invention will now be described in conjunction with the following drawings, by way of example only, in which:

FIG. 2 shows an example series of images of the system of FIG. 1;

FIG. 9 shows example workflows of image processing functions and neural networks processing of the system of FIG. 1;

FIG. 10 illustrates different ways of identifying objects of interest using different neural networks of the system of FIG. 1;

FIG. 11 shows different kinds of information on a display of the device of the system of FIG. 1; and FIG. 12 shows automated incident identification reporting to users of the system of FIG. 1.

DESCRIPTION

Figure 1:
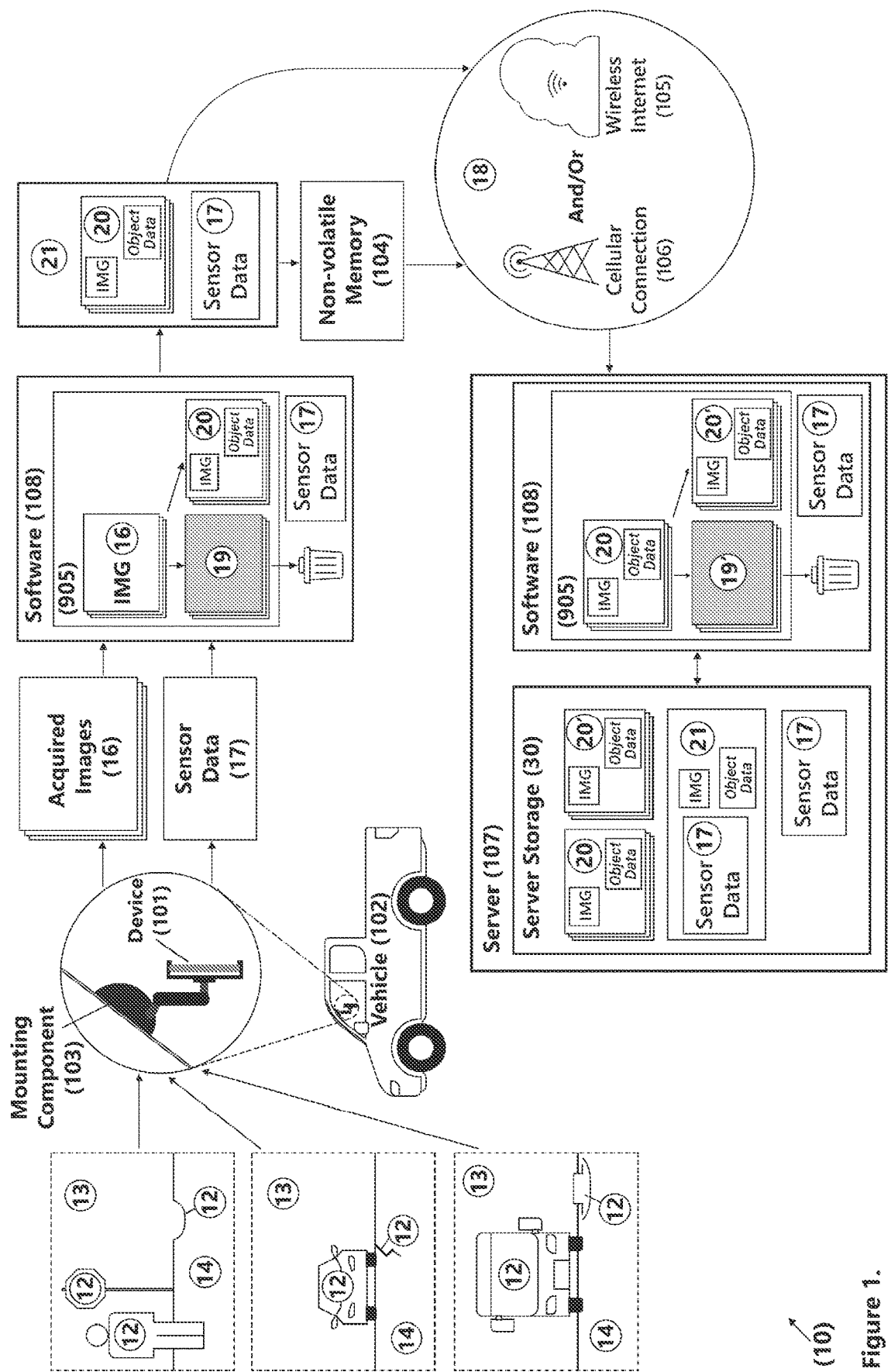
FIG. 1 shows components of a system for automatically detecting objects and incidents, and storing and transferring them to a server.

Referring to FIG. 1, shown is a system 10 designed to automate identification and reporting of road related incidents/conditions/objects 12 (e.g. pavement damage, street sign damage, debris on road, etc.) with respect to a road surface 14 and/or adjacent road surface 14 surroundings 13 in real time. The road related incidents/conditions/objects 12 are hereafter referred to generically as objects 12, for ease of description purposes only. Digital images 16 are taken by one or more imaging devices 101, e.g. a smartphone or other portable imaging device preferably with network connection capabilities to a communications network 18 (e.g. wireless network 105, cellular network 106, etc.). Only selected data portions 20 (e.g. image frames 16a,b, c, d—see FIG. 2) of the images 16 can be transmitted over the network 18 by the device 101 to a server 107 for subsequent processing/reporting, as further described below, such that image discard data 19 is excluded (see FIG. 4) from object data 21 transmitted to the server 107. Alternatively, unprocessed image(s) 16 can be transmitted by the device 101 over the network 18, as they are acquired in real time (subject to network 18 connectivity constraints), to the server 107 for subsequent processing. It is also recognized that both resultant processed image data 20 and unprocessed images 16 can be transmitted to the server 107 by the device 101 over the network 18 (e.g. as object data 21 including the sensor information 17). In any event, it is recognized that it is advantageous for the system 10 to be configured to preferably send object data 21 by the device 101 to the server 107 as the object data 21 is acquired, in order to take advantage of image 16 processing and acquisition efficiencies as discussed.

It is recognized that one advantage of the current system 10 is that storing and/or sending of the object data 21 can occur in real time while the device 101 continues collection and processing of additional digital images 16 for a second section of the roadway 14 different than the first section of the roadway 14 associated with the sent object data 21. As such, the system 10 is configured to continuously store/send respective sets of object data 21 for respective differing sections of the roadway 14 on a real time basis and/or scheduled basis, dependent upon appropriate network 18 connectivity between the device 101 and the server 107. Accordingly, sending of the object data 21 over the network 18 can include queuing a set of object data 21 in memory 99, 104 for before transmission to the server 107.

The device 101 is mounted by a mounting component 103 to a body 22 of a vehicle 102 (e.g. car, truck, bus, etc.), such that an imager 500 (e.g. camera 500—see FIG. 5) has a viewpoint of the road surface 14 and optionally any desired adjacent surroundings 13 (e.g. roadside, overhead, etc.). Accordingly, during operation of one or more vehicles 102 along the road surface 14, the imager(s) 500 of the device record/capture the images 16 according to the configured viewpoint (as facilitated by orienting the device 101 with respect to the road surface 14 and/or adjacent surroundings 13 as per the capabilities of the mounting component 103). It is recognized that the captured images 16 will contain recorded data of the objects 12, which will be identified by image processing instructions 905 (stored in memory 99 provided by computing infrastructure 100 of the device 101—see FIG. 7), also referred to generically as neural network(s) 905.

Figure 7:
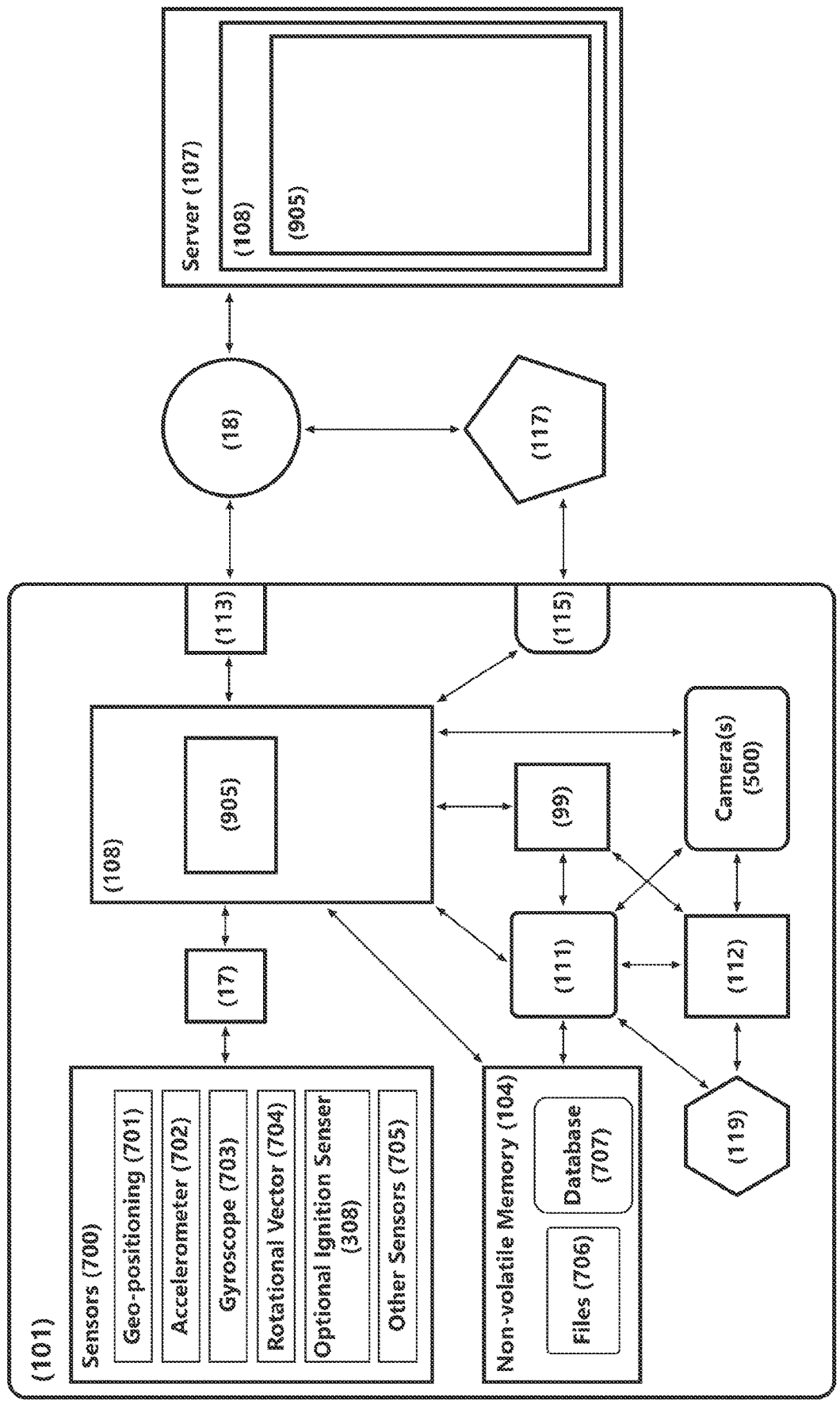
FIG. 7 shows example sensors used by the device to detect and store additional information along with each of the incident images captured of the system of FIG. 1.

Referring to FIGS. 1 and 7, the system 10, as an example, can utilize device 101 (e.g. a mobile computing device such as smartphone, smart camera or embedded computer system) physically coupled to the vehicle 102 (an automobile to which the device 101 is attached) by the mounting component 103 (i.e. attaching the device 101 to the vehicle 102). In general, the device 101 executes software 108 (i.e. stored instructions) which collects image data 16 (the digital images 16) from the device's 101 camera(s) 500 (the imagers 500) and infers (i.e. determines) any objects 12 present in the images 16 using the neural network(s) 905 (e.g. image processing instructions 905) by way of a computer processor 111 and/or a graphics processor 112. The device 101 transmits the data 20 (containing information about the objects 12 identified from the images 16) along with acquired sensor 700 information 17 to the server 107 (via the network 18 utilizing the cellular connection 106 or wireless connection 105, for example). The device 101 can store data (e.g. images 16, processed data 20, sensor information 17) in non-volatile memory 104 (of the computing infrastructure 100) prior to transmitting any of the data 20/sensor information 17 over the network 18. The processed data portions 20 (containing the identified object(s) 12 of interest) and/or sensor information 17 can be referred to generically as object data 21 (see FIG. 1). As discussed herein, the embodiment of image 16 processing by the device 101 is considered only one example. As such, it is recognized that processing of images 16 can be performed by the device 101 alone, by the server 107 alone, or by both the server 107 and the device 101 as provided for in FIG. 4 for the shared/distributed processing environment 400.

The server 107 can facilitate as gateway to users (of the device 101) to make data available to other users (e.g. road supervisors, construction managers, etc.) in a meaningful and intuitive manner by way of accessing any of the data 20/sensor information 17 received by the server 107. It is recognized that as one embodiment, the resultant processed data 20 containing information of the identified objects 12 (from the images 16) can be portions of the images 16 themselves. Alternatively, or in addition to, the resultant processed data 20 can also include metadata (e.g. descriptions/descriptors) of the objects 12 identified from the images 16 by the image processing instructions 905. For example, the descriptions/descriptors of the objects 12 can include object type (e.g. road sign, pothole, road debris, etc.), object size (e.g. 10 cm wide by 20 cm deep), etc. In any event, it is recognized that the resultant processed data 20 represents only a portion of the total images 16 data recorded by the imager 500, such that images 16 (and/or the descriptions/descriptors representing the images and their image contents) not containing objects 12 (of interest) are excluded (e.g. the image discard data 19) from the resultant processed data 20 sent over the server 107 over the network 18, as one example embodiment.

Device 101

It is recognized that the device 101 is an integral part of the system 10. Referring to FIGS. 1 and 7, the device 101 can be consist of a plurality of hardware and software components that are configured to automatically collect visual, location and sensor data (e.g. images 16 and sensor information 17) while affixed to the vehicle 102 travelling along the road surface 14. Components that typically make up the device 101 are embedded in the computing system/infrastructure 100, typically inclusive of a central processing unit (cpu) 111 and/or a graphics processing unit (gpu) 112 and memory 99, 104 including a high speed volatile memory such as a ram as well as non-volatile memory, any of which facilitates the device 101 to execute its software 108 (e.g. operating system, image processing instructions 905, etc.). The device 101 may also have a read only memory 99, 104 for storing instructions necessary for operation of the device 101. Further, the non-volatile memory 104 can be associated with storing files 706 associated with operating system(s), component driver(s), application(s), and media, alongside other software applications resident in memory 99 of the device 101. The device operating system (e.g. part of the software 108) can be such as a windows operating system, android operating system, linux operating system, or other operating system, whether embedded or not.

The device 101 can also have one or more data transmitting and receiving components (communication components operating a network interface 113 to the network 18) which can be wireless. Further, the device 101 can interface with external wireless communication components 117 via wired connector 115, such as a usb connection or an ethernet connection, in order to transmit the data 20 and sensor information 17 over the network 18 to the server 107, as an example.

In terms of sensors 700, the device 101 can have, by way of example, a geo-location sensor 701 or a geo-positioning sensor 701, provide location based information using satellite (such as gps, glonass, galileo) or cellular tower locations to determine device positioning information (as part of the sensor information 17). The device 101 may also utilize sensors 700 related to its positioning, location and orientation such as accelerometer sensor 702, gravity sensor/gyroscope sensor 703, rotational axis sensor 704 and/or other sensors 705. The device 101 will typically utilize a battery 307 (see FIG. 3) which can facilitate operation of the device 101 even when connection to vehicle power 302 is temporarily interrupted. For example, in the event that the vehicle 102 is temporarily shut-off, such as when filling gas, the device 101 can continue to operate on its battery 307 charge, in order to effect the image processing of the acquired images 16 and subsequent sending of the resultant processed data 20 and sensor information 17 over the network 18 (see FIG. 4), as an example.

Further, the device 101 can have a user interface 119 including a display, built-in or external, in order to display information from the device 101, to an operator of the device 101, the display information such as but not limited to the camera 500 field of view (viewfinder), the orientation of the device 101, status indicators, settings, parameters, and other information related the installation, configuration operation, and maintenance of the device 101.

As further described below, the device 101 can execute the software 108 (including the artificial intelligence neural network(s) 905) for detection and classification of objects 12 of interest in the acquired images 16 in order to infer (e.g. determine) what object(s) 12 are present in images 16 and/or the position of the object 12 in the images 16. The software 108 can also collect, process, store and transmit sensor information 17 from its sensors 700 for the geo physical location (e.g. GC a, b, c, d—see FIG. 2) in which the image 16 was acquired with respect to the road surface 14 (i.e. geographical coordinates of the portion of the road surface 14 that contains the objects(s) 12).

Further to the above, it is recognized that the device 101 components can be packaged together in a common housing (not shown) or some components can reside externally to the device 101 and connected via currently common interface connector 115 such as a USB port. Examples of electronic devices that can be configured to function as the device 101 can include smart phones, smart cameras and embedded computer systems. For example, a smartphone 101 can be defined as a mobile device that contains components within to run the software 108. This device 101 can be ideal for a portable installation facilitating for easy transfer between different vehicles 102. Example of currently available capable smartphones are Samsung galaxy s10, s10+, s20 models, Samsung note s10, s10+ models, LG g8, iPhone 11 pro, iPhone 11. It is expected that many of the newer smartphone models by the majority of the smart phone manufacturers can also perform as a device 101 when enabled with the software 108 (i.e. including the neural network(s) 905 as further described below).

For example, a smart-camera 101 can be defined as a camera with image processing capabilities (e.g. software 108) that is capable to execute the instructions of the artificial intelligence neural network(s) 905. For instance, a camera 101 containing artificial intelligence enabled chipsets such as Intel Movidius, Nvidia Cuda, Texas Instrument Sitara, Qualcomm Adreno series, etc. Alternatively, the camera 101 can be packaged together with an embedded cpu 111 (such as the likes made by companies such as Intel, Amd or Arm) which facilitates execution of the artificial intelligence neural network 905. The camera sensors 700 and transmission components (e.g. network interface 113) can be embedded or externally connected, as desired.

For example, the embedded computer system 101 can be defined as a computing device 101 that is designed to operate (via the software 108) with some resistance to shock, vibration and temperature fluctuations. Sensors 700 are embedded and/or provided as peripheral (i.e. External) devices. The embedded computer system 101 can be considered for permanent installation in the vehicle 102 or for installations with multiple cameras 500. Current examples of embedded computer systems 101 include Nvidia Jetson AI platform, Google coral edge series, raspberry pi series, rugged industrialized embedded computers specifically environmentally hardened for use vehicles 102, or other computing devices 101.

Example Embodiments for Imagers 500, Also Referred to as Cameras 500

Figure 5:
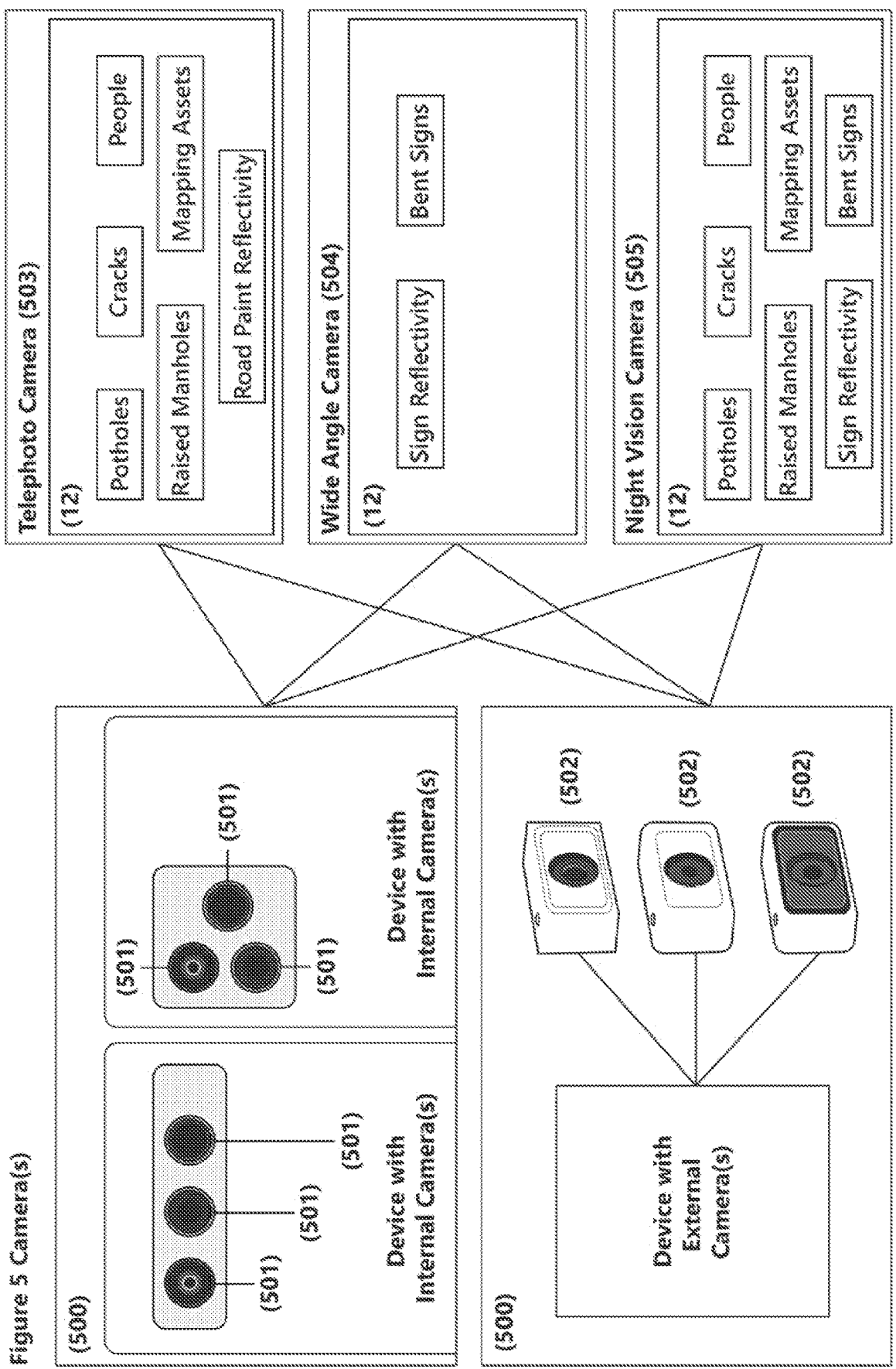
FIG. 5 shows device camera options and examples of objects that different lenses are used to capture of the system of FIG. 1.

Referring to FIG. 5, the device 101 can be equipped with internal camera(s) 501 or external camera(s) 502 which can be of different types such as telephoto 503, wide angle 504, or night vision 505, or other types of cameras 500 (e.g. imagers 500), used to record a digital image 16 as acquired by the device 101 as the vehicle 102 traverses along the road surface 14. It is recognized that some of the images 16 acquired will contain object(s) 12 of interest, while others of the acquired images 16 will not contain any desired object(s) 12 of interest. As further discussed below, the acquired images 16 can be embodied as a series/plurality of image frames 16a, 16b, 16c, 16d, for example (see FIG. 2). The image frames 16a, 16b, 16c, 16d comprise the plurality of images 16 acquired by the device 101 as the vehicle 102 travels along the road surface 14 (see FIG. 1).

As the device 101 primary sensor is a camera 500, the device 101 can include at least one camera 500. Depending on the configuration of the device 101, the device 101 can encase one or more cameras 501 (for example, if the device 101 is a modern smartphone). The device 101 can also be encased in a camera 501 (for example, if the device 101 is a smart camera, or an ai enabled camera). The camera(s) 500 can also be attached to the device 101 externally 502. For example, the device 101 can be an embedded computer connected to an external camera via a wired or wireless interface. The device 101 can utilize internal camera(s) 501 and external camera(s) 502 at the same time. For example, a smart phone 101 can utilize its built in camera 500 to process images 16 acquired facing the front of the vehicle 102, whereas wireless cameras 500 could be mounted on the sides of the vehicle 102 transmitting images 16 wirelessly to the smartphone 101.

The device 101 can have different type(s) of camera(s) 500. Some examples of different types of cameras 500 include telephoto 503, whereas the camera 500 is optimized to capture images in the distance; wide angle 504 camera(s), whereas the camera 500 is optimized to detect an image 16 with a wide field of view; and/or a night vision 505 camera, whereas the camera 500 is optimized to acquire images at low light settings.

Different camera(s) 500 can be used for different use cases. For example, a wide angle camera 504 may be used to detect issues with signage 12 (for example, a damaged sign), whereas a telephoto 503 camera can be used to detect road defects 12 (for example, cracks or potholes); and an infrared camera 505 can be used for night time image 16 acquisition. The types of incidents 12 noted in FIG. 5 are for illustration and do not mean that the incidents 12 depicted are exclusive to the camera 500 type as given by example.

Further, a device 101 can utilize multiple cameras 500, internal and/or external simultaneously. For example, the device 101 can be attached to a vehicle's 102 windshield and have both a telephoto 503 and a wide angle 504 camera internally 501. The telephoto 503 camera may be used to detect road defects 12 (for example, cracks and potholes) and road issues 12 (for example, faded lane markings or open manholes), while at the same time, the wide angle 504 camera can be used to detect damaged signs 12. The same device 101 can also be connected to two external 502 cameras 500 mounted on the vehicle's 102 side windows, facing the roads and curb as part of the desired road surface 14 and surroundings 13 in the camera's field of view. The external cameras 500 can look for road damage 12 and curb damage 12.

In some use cases, different cameras 500 can be used under different circumstances. For example, at night when lighting conditions are poor, the device 101 can switch from one camera 500 to another optimized for night vision 505. This may be done programmatically with the use of the software 108, based on schedule (for example, based on a sunset timer), image parameters (such as exposure or brightness), or a sensor 700 (for example, when a light sensor determines it is less than certain luminance level). It can also be done manually by a driver selecting a different camera 500 or selecting a "night mode" which includes the night camera 505. Similarly, in some use cases, the same cameras 500 can be used with different camera settings. Examples of settings that may be adjusted for night time operation include frame rate, resolution, aperture, ISO, brightness, and/or shutter speed. As an example, at night when lighting conditions are poor, the device 101 can switch from daytime camera settings to nighttime camera settings. This may be done programmatically with the use of software 108, based on schedule (for example, based on a sunset timer), image parameters (such as exposure or brightness), or a sensor (for example, when a light sensor determines it is less than certain luminance level). It may also be done manually by a driver selecting a different camera or selecting a "night mode" which includes the camera night time settings.

Some digital cameras 500 can give access to almost all the image 16 data captured by the camera 500, using a raw image format. An example type of the cameras/imagers 500 can include digital image sensors using metal-oxide-semiconductor (MOS) technology. Another type is digital semiconductor image sensors, including the charge-coupled device (CCD) and the CMOS sensor. Another type can be the NMOS active-pixel sensor (APS).

Images 16

The vehicle 102 uses imagers/cameras 500 to record the series of digital images 16 (as acquired by the device 101) while the vehicle 102 traverses along the road surface 14. It is recognized that some of the images 16 acquired will contain object(s) 12 of interest, while others of the acquired images 16 will not contain any desired object(s) 12 of interest, as determined by the image processing instructions 905. As further discussed below, the acquired images 16 can be embodied as a series/plurality of image frames 16a, 16b, 16c, 16d, for example (see FIG. 2). The image frames 16a, 16b, 16c,16d comprise the plurality of images 16 acquired by the device 101 as the vehicle 102 travels along the road surface 14 (see FIG. 1). The images 16 can be embodied as captured individual still image frames 16a, 16b, 16c, 16d and/or embodied as captured video containing the individual frames 16a, 16b, 16c, 16d, as desired. As shown by example, image frames 16b and 16d contain objects 12, while image frames 16a and 16c do not contain any objects 12. Further, it is recognized that the plurality of image frames 16a, 16b, 16c, 16d are captured sequentially with respect to one another, i.e. distributed sequentially over recorded time and distance along the road surface 14, as further discussed below. As discussed, the images 16 may actually contain potential objects 12 of interest, (e.g. a pothole), however these potential objects 12 of interest could be processed as discarded image data 19 and thus not included in the resultant processed image data 20 (e.g. as provided by the device 101 and/or the server 107).

One example of discarding a potential object 12 is where a geo coordinate GC a, b, c, d matches an already transmitted object 12 of interest in a previous transmission object data 21 to the server 107. In this manner, duplication of objects 12 in the data 20 can be advantageously inhibited. Another example where a potential object 12 is retained in the resultant processed object data 20 is where the geo coordinate GC a, b, c, d does match the GC a, b, c, d of the object 12 in a previous transmission of object data 21, however a state of the potential object 12 has changed (e.g. a state such as a size of the object—a pothole size of the potential object 12 has increased over the size of the same object 12 reported in previously transmitted object data 21 for the same pothole 12 at that identified GC a, b, c, d).

For example, as shown in FIG. 2, the selected image frames 16a, 16b, 16c, 16d of the plurality of images 16 provide for some imaged portions 14a,b,c,d of the road surface 14 or surroundings 13 containing objects 12 while others do not. As an illustrative example, the respective geo coordinates GCa, b, c, d (e.g. sensor information 17a,b,c,d) for each image frame 16a,b,c,d of the images 16 can be used to represent contiguous sections (overlapping or non overlapping in geographical coordinates) of the road surface 14 or surroundings 13 portions 14a,b,c,d. As such, it is clear from the example image frames 16a,b,c,d provided that image road surface/surrounding 14a (in image frame 16a) and road surface/surrounding 14c (in image frame 16c) do not contain any objects 12. On the contrary, image portion 14b (in image frame 16b) and image portion 14d (in image frame 16d) do contain objects 12. Further, for example, geo coordinates GCa, b, c, d can represent physical geographical coordinates (e.g. provided by sensors 700 of the device 101 associated with at what geographical position the vehicle 102 was at on the road surface 14 when the particular image frame 16a,b,c,d was recorded). As such, as further discussed below, the image processing instructions 905 are used by the device 101 to determine that image frames 16b,d contain object(s) 12 and image frames 14a,c do not contain object(s) 12. Further, it is recognized that each image frame 16a,b,c,d can have a positional reference frame REFa, b, c, d, such that the physical location of the object 12 within the image frame 16b,d can be specified. Also as discussed below, it is a distinct advantage of the current system 10 to have an ability to identify those images 16 (e.g. image frames 16a,c) that do not contain any objects 12 of interest and thus can be discarded and thus not be included as part of the object data 21 (e.g. transmitted to the server 107—see FIG. 1). As further discussed below, it is recognized that just because a particular image frame 16a,b,c,d contains an object 12, as identified by the image processing instructions 905, the identified object 12 may still subsequently be discarded by the image processing instructions 905 for a number of reasons (see below).

As such, any discarded image data (e.g. discarded data 19—see FIG. 4)) from the images 16 constitutes bandwidth transmission savings for communication of the object data 21 between the device 101 and the server 107. Further, any discarded image data 19 (e.g. entire frames 16a,b,c,d and/or selected portions of an image frame 16a,b,c,d) from the transmitted object data 21 can also result in downstream data processing/storage savings by the server 107. It is clear, as discussed below, that the system 10 can take advantage of a split image processing framework 400, see FIG. 4 further discussed below, such that a first portion 402 of the image 16 processing can be performed on the device 101 itself (i.e. prior to transmission of the object data 21 to the server 107), while a second portion 404 of the image 16 processing can be performed on the server 107 post receipt of the object data 21. For example, the image processing instructions 905 can be used as a first image processing portion 402 to identify objects 16 of interest and thus discard/exclude data 19 representing entire frames 16a,b,c,d (or portions of frames 16a,b,c,d) before transmitting the object data 21. The server 107 can then be tasked with identifying the relevance of the objects 12 of interest in the object data 21, including for example the physical position (e.g. REFa, b, c, d) of the objects 12 in the frames 16a,b,c,d included in the object data 21 as part of the second image processing portion 404. It may also discard or re-acquire/refresh incident images 16 based on a timer that expires (for example, a certain number of days has elapsed) or based on distance from previously noted incident (as the GPS may not be 100% precise), and as such, data 19 can be discarded based on previously recorded incident.

Figure 6:
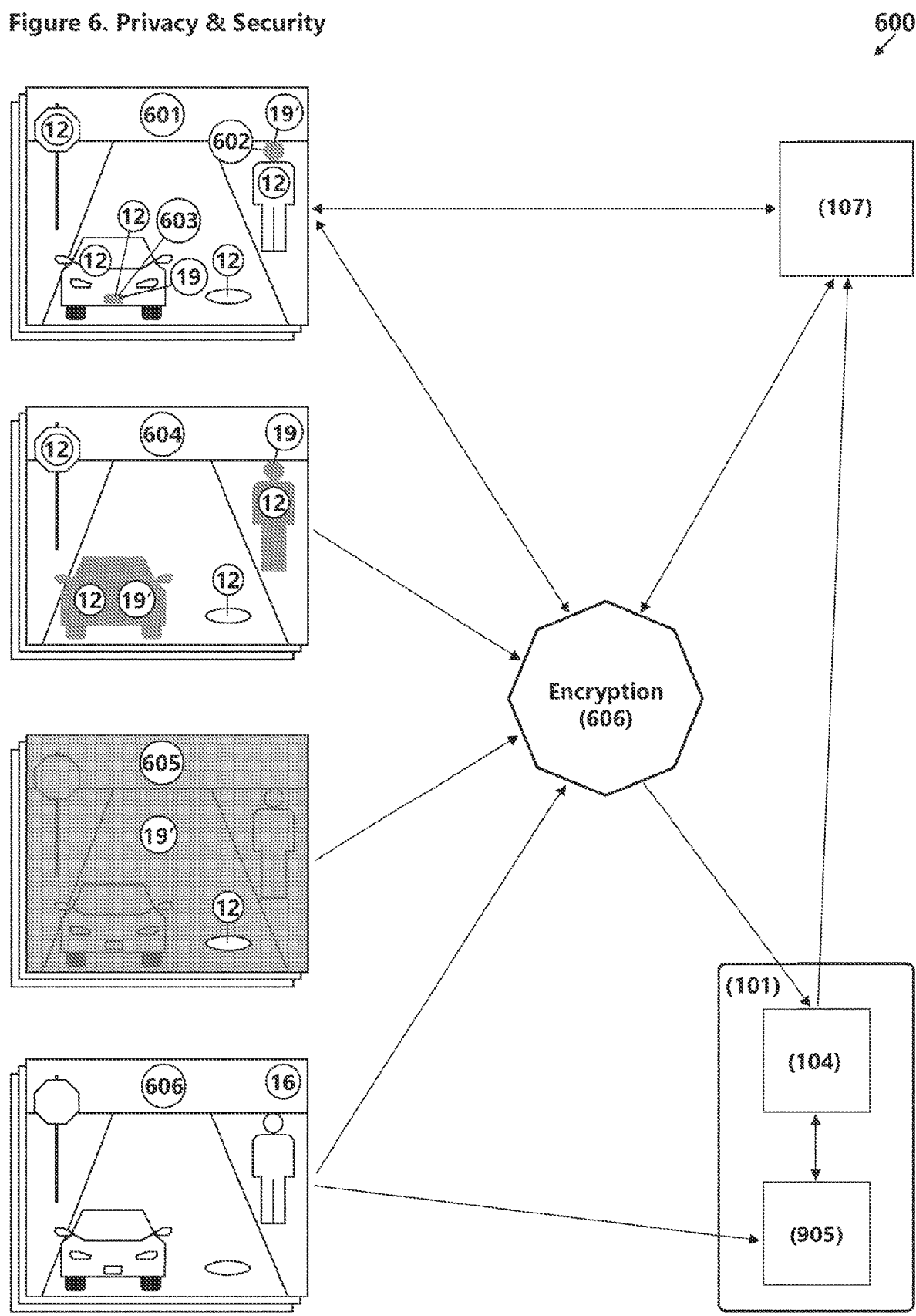
FIG. 6 shows an example of image capture, redaction and other processing before being encrypted and stored in device or transmitted to the server of the system of FIG. 1.

Accordingly, the image discard data 19 is considered as those portion(s) of image 16 data that does/do not contain determined object(s) 12 of interest by the image processing instructions 905, e.g. as implemented by the processor 111 of the device 101. Examples of the image discard data 19 are shown in FIG. 6. For example, image information 601, 604, 605 shows example image data content 20 as included (e.g. image data of the images 16 representing the identified object(s) 12 of interest) as well as image discard content 19 as discarded. As discussed, the discarded image content 19 can be withheld from inclusion in the object data 21 transmitted to the server 107 (see FIGS. 1 and 4).

In terms of format, a digital image 16 can be an image 16 containing digital data content (e.g. both data 19 and data 20 as present prior to processing) representing picture elements, also known as pixels, each with finite, discrete quantities of numeric representation for its color intensity or gray level that is an output from its two-dimensional functions fed as input by its spatial coordinates denoted with x, y on the x-axis and y-axis, respectively (e.g. positional reference frame REFa, b, c, d). The image would be acquired either as raw image data available in various formats such as YUV RGB, HSL, HSV, or other image color spaces and encodings as available from the camera 500 device. The data (e.g. both data 19 and data 20 as present after to processing) may be available in the form of coordinates which can be scaled similar to vector images. Vector images can have the unique advantage over raster graphics in that the points, lines, and curves may be scaled up or down to any resolution with no aliasing. The points determine the direction of the vector path; each path may have various properties including values for stroke color, shape, curve, thickness, and fill. As such, it is recognized that part of the image 16 acquisition and subsequent image processing (by the image processing instructions 905) can be used to incorporate data 19, 20 which can be overlayed on the image in a vector graphics or a separate raster image and flattened/merged into the image 17 itself to display the detection 12 in the image 16. The data 21 may be overlayed/incorporated into the image data 20 or stored and sent separately, with association to the respective image 16. As discussed above, images 16 can be acquired through digital cameras 500, which use any of several image file and color space formats known in the art.

It is recognized that the images 16 can be compressed using any known compression technology, before they are sent as part of the object data 21 (as discussed) to the server 107. It is also recognized that image compression is not used by the device 101 (e.g. by the system 900—see FIG. 9) to identify objects 12 of interest in the images 16, in order to produce the processed image data 20. In other words, data compression can be utilized downstream of generation of the processed image data 20 (used to separate or otherwise remove the image discard data 19 from the overall plurality of image data 16 acquired initially by the camera(s) 500 of the device 101).

For example, the camera 500 and/or the image processing instructions 905 can utilize digital image compression, for those portions of the images (e.g. frames 16a,b,c,d determined to contain object(s) 12 of interest), before transmitting such image data 20 in the object data 21 (e.g. see FIG. 1). For example, digital image compression technology can incorporate discrete cosine transform (DCT), a lossy compression technique. For example, as an image format for any image data of the object data 21, JPEG compresses the image content down to relatively smaller file sizes. For example, the DCT compression algorithm of the JPG format can be used.

Vehicle 102

The device 101 is intended to be used when deployed in the vehicle 102. In many cases, the vehicle 102 can be a vehicle that is operated on behalf of an organization which can be governmental, quasi-governmental or a private company. It can also be used voluntarily by individuals as a crowd-sourced application.

Examples of governmental organizations include all levels of government, including national, federal or republic government; provincial, territorial or state government; municipal government, including municipalities, upper tier municipalities (such as metropolitan, regional, county or other name used to describe major upper tier municipalities), or lower tier municipalities (such as city, village, township, town, community, or other name used to describe). The governmental organization may also be a special organization, such as a reserve, resort, other name that is used to describe the local government of a certain geography and population. Examples of quasi-governmental organizations would be government-owned or supported organizations. Those could be organizations established as part of a public-private-partnership or a concession to build, maintain and/or operate an asset or a service over a period of time. They could be separately incorporated but the government may have full ownership, majority ownership, or minority ownership. The government's representatives can sit on the board of such organizations. Examples of quasi-governmental organizations include toll road concession companies, bridge concession companies, transportation and/or transit authorities, and/or utility or telecom companies. A private company can simply be a private company that is the owner of the asset that is to be inspected, or contracted on behalf of the owner to do so.

The vehicle 102 can be a service vehicle dedicated to patrolling an area for the specific purpose of identifying incidents/objects 12 on behalf of the organization. The vehicle 102 can be a car, a truck, a golf cart, a tractor, an atv, a bicycle, an e-bike, a motorbike, a motorcycle, a snowmobile, a van, or a customized utility vehicle, for example. The vehicle's 102 primary purpose can be different than acquiring incidents/objects 12, but augmented with the device 101 mounted for a supplemental function of incident/object 12 detection on behalf of the organization. Examples include garbage trucks, snowplows, operational service vehicles, utility vehicles, road and sidewalk sweepers, public transportation vehicles such as buses, school buses, and transportation vans or taxis. The vehicle 102 can also be a private vehicle owned by an individual, whereby the individual contributes incident object 12 data detected by the device 101 on a good will to the organization, or for monetary compensation. The vehicle 102 can also be an autonomous vehicle 102 operated privately or by an organization, whereas the autonomous vehicle 102 can be equipped with the device 101 to automatically detect incidents/objects 12 in the area in which it operates.

Mounting Component 103

The device 101 is intended to be mounted in the vehicle 102 using the mounting component 103. Typically, the device 101 can be mounted to the vehicle's 102 windshield (e.g. a portion of the body 22—see FIG. 1), though it can also be attached to the dashboard, the side windows, the back windows, or the vehicle 102 frame, as desired. The mounting component 103 configuration can be different for different vehicle 102/device 101 combinations. For example, depending on whether the device 101 is a smartphone, a smart camera, or an embedded computer with external camera different mounting configurations can be used. Different mounting configurations can also be used depending on whether the device 101 is to be permanently affixed to the vehicle 102 or transferable between different vehicles 102. The vehicle 102 can utilize the mounting component 103 of different types. For example, the mounting component 103 can be attached to the vehicle 102 via a suction cup, a sticky tape, glue, or screws and bolts, for example. The mounting component 103 can allow for an easy removal of the device 101 by having the device 101 easily detach from the mounting component 103. The mounting component 103 itself can also have multiple parts which facilitate detaching parts of the mounting component 103 together with the device 101.

Non Volatile Memory 104

The storage capabilities (e.g. memory 99, 104, etc.) of the device 101 can have the non-volatile memory 104 associated for storing files 706 associated with operating system(s), component driver(s), application(s), and media, alongside other files used in software applications. The non-volatile memory 104 can be embedded in the device 101, an add-on, and/or a peripheral. For example, smartphones currently come with built in non-volatile memory 104, which can be expanded using non-volatile memory 104 add-ons (for example, microsd memory). Embedded computers typically come with a variety of hard drives, flash drives, and interfaces which allow for including one or more non-volatile memory 104 storage components.

The device's 101 software 108 can store digital data, such as the acquired incident images 16, data portions 20 of the images 16 including data about the identified objects 12 from the images 16, and associated sensor 700 data (e.g. sensor information 17) onto the non-volatile memory 104. It is recognized that the data portions 20 are those determined excepts (e.g. frames 16a,b,c,d) from the images 16 that contain the objects 12 of interest.

The device 101 (e.g. via software 108) can store the images/data 21 to the non-volatile memory 104 prior to transmitting over the network 18 for a variety of reasons. For example, cellular 106 connectivity may not be reliable, and the data 21 would have to be stored temporarily before transmitted. If cellular connection 106 or wireless connection 105 to the internet 18 is not available (e.g. out of cellular network coverage or out of the wireless range) during operation, the software 108 will store the images 16, 20 and their associated data 17 to the device's 101 non volatile memory 104. Once the connectivity has been restored, the software 108 will resume uploading the object data 21 to the server 107.

Some organizations may also opt to utilize wireless connectivity 105 in order to save on cellular data costs, and as such, the data 21 would be stored until such time that the device 101 has access to wireless 105 access point, which is connected to the internet 18. The device 101 may also benefit from a performance, power, and/or heat management perspective to only transmit data once the vehicle 102 is idle (for example, idle in traffic or in a parking lot). The device 101 may also be benefit from a performance, power, and/or heat manage perspective to initiate an upload process as a scheduled process as opposed to an ongoing process.

The files 706 and/or database 707 (representing any of the images 16, sensor information 17, and/or data portions 20—i.e. processed images 16) may be in an encrypted format in the memory 104 to secure the information. The files 706 and/or database 707 are deleted from the non volatile memory 104 when they are successfully uploaded to the sever 107. The data 16, 17, 20 can be stored on the non volatile memory 104 in various file formats. Image data can be stored as compressed or uncompressed files such as jpegs, bitmaps, webp, png, and other common image formats. The associated sensor data 17 can be stored as a metadata file (for example, an xml file), a table file (i.e. a csv or a txt file), or in the database 707. The files 706 may also be stored in a common file 706 format or in a proprietary one.

Wireless Connection 105

The device 101 can include the wireless connection 105 network interface in order to connect to the server 107. For example, a wireless connection 105 can be may be wireless lan or wi-fi, operating at common frequencies such as 2.4 ghz, 5 ghz, or other frequencies typically associated with ieee 802.11 or other wireless standards. The wireless connection 105 has the advantage that it typically allows to upload a large volume of data without the cost of cellular data usage.

Cellular Connection 106

The device 101 can include a cellular connection 106 network interface in order to connect to the server 107. For example, the cellular connection 106 can utilize technologies such as 3g, 4g, lte, 5g or other technologies used for access to cellular towers. The cellular connection 106 provides for communications with the server 107 on a constant, frequent or periodic basis, allowing the incidents 12 (contained in the object data 21) to be generated as communications are taking place. It is expected to be used in many scenarios including when cellular cost is not a major issue, when cellular connection is available, when faster response to incidents is necessary, and/or when the device 101 does not have access to wireless connectivity 105.

Server 107

The server 107 is responsible for the organizing, storing, processing and disseminating of the object data 21 uploaded by the device(s) 101. A single server 107 can host a plurality of users, whether governmental users, quasi-governmental users, or private organizations. A single server 107 can communicate with a plurality of devices 101 as clients of the server 107. The object data 21 of each client is securely segregated from each other where one user cannot access the object data 21 of other users, unless a user purposely marked their data for sharing, for example. When the server 107 receives object data 21 from a device 101 through the internet 18, the image data (e.g. frames 16a,b,c,d) containing objects 12 of interests are stored in a server storage 30 to a folder allocated specifically to the particular device 101 and user's organization. It can be further organized by date, road segments, or other hierarchal structure, as desired. The server 107 can store image data 16, sensor data 17, object data 21, resultant processed data 20, resultant processed data 20' and/or discard data 19, 19', as desired. For example, the device 101 can send the discard data 19 to the server 107, as part of the object data 21 or subsequent to sending the object data 21, as desired.

Accordingly the discard data 19, 19' can be defined as the data removed from the images 16 in order to produce the object data 21 (e.g. containing the processed images 20). For example, the discard data 19 could be inclusive of one or more whole frames/images 16a,b,c,d that are dropped (e.g. removed from the images 16 and/or sensor data 17) before sending the resultant object data 21 (as a result of utilizing the image processing instructions 905 on the captured images 16 and/or sensor data 17). For example, the image processing instructions 905 can also include utilizing the sensor data 17 in order to identify the objects 12 and/or discard data 19. For example, the sensor data 17 (such as direction and/or GPS data) can be used by the device 101 to recognize and extract the discard data 19 from the image data 16. For example, images 16 captured are associated with sensor data 17 during their capture (e.g. direction of vehicle travel and GPS data for recognizing the geo position of the captured images 16). As such, when new subsequent images 16 are taken, having sensor data 17 (e.g. direction and/or GPS data) matching that sensor data 17 of the previously recorded images 16, the newly acquired images 16 can be discarded (either in whole or in part). The newly acquired images 16 could be considered by the device 101 (as a result of executing the image processing instructions 905 on the previous images 16 and newly acquired images 16 and their associated sensor data 17) as duplicate data in view of the match in sensor data 17 between the previous images 16 and the newly acquired images 16.

Additional information, such as sensor data 17, geographical coordinates GCa, b, c, d, direction of travel, date/time, pitch, and/or data of the object data 21 describing the object 12 of interest in the image can be associated to each incident image (e.g. image frame 16a,b,c,d) and also stored into one or more database(s) 30 on the server 107. The server 107 is depicted in the system 10 as a single server 107. While it may be deployed as a physical server, there may be more than one server 107 segmented by geography (for example, Canada, Us, Mexico or other countries), by architectural function (DNS, runtime, database, storage, image processing, reporting, or other function), by capacity (for example, users 1-1000 reside on server 1, whereas users 1001-200 reside on server 2), logically (such as a virtual machine that runs on a server cluster, or on a cloud), or in other common ways in which servers which provide software as a service are setup. For greater clarity, the word server 107 and server(s) 107 will be used interchangeably throughout the description, figures and claims as the system 10 could be setup to use one or more physical, virtual or cloud based servers 107.

Software 108

The software 108 can be responsible for acquiring image 16 data from the camera 500, acquiring geographical positioning data 17 from the geo-positioning sensor 701, collecting sensor(s) data 17, collecting other system information such as date and time, identifying incidents 12 using image processing function(s) and neural network(s) inference workflow(s) of the image processing instructions 905, and reporting the identified incident(s) 12 (considered of interest) through communications of the object data 21 with the server(s) 107, for example. The software 108 is responsible for other functions, which are relevant to the operation of the unit, such as storing images and data to the device's 101 non volatile memory 104 in an encrypted or not encrypted, redacted or not redacted format, and controlling the content on the device's 101 display 119, if available. The software 108 may also provide functions pertaining to the configuration, calibration, and operation of the device 101. The software 108 may also communicate with the server(s) 107 for the purpose of downloading updates, settings, configuration parameter(s), neural networks(s), data and/or files. The software 108 may also communicate to the server(s) 107 of sending non-incident information, pertaining to the performance, status or diagnostic information for the device 101.

Figure 3:
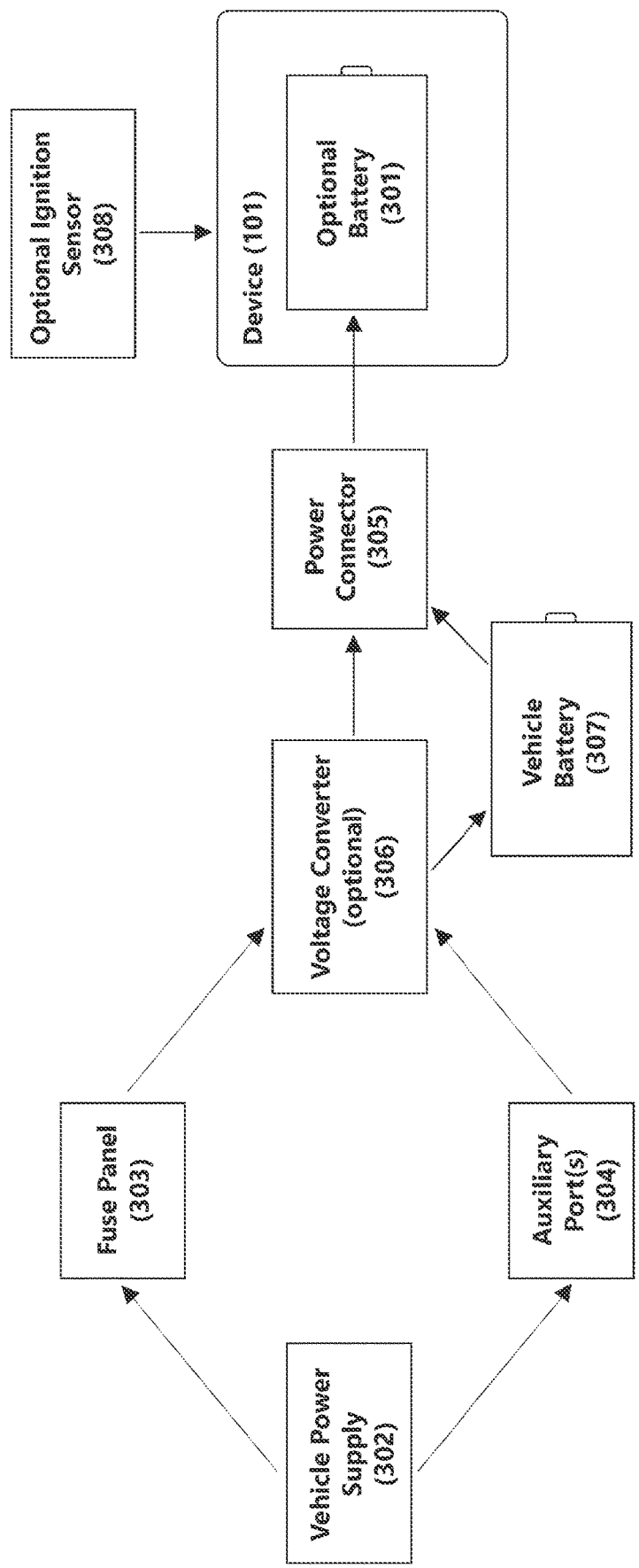
FIG. 3 shows options for powering a device of the system of FIG. 1.

Referring to FIG. 3, shown is a variety of options which the device 101 can be powered. A device 101 such as smartphone, smart camera or embedded computer system, with an optional battery 301 that is connected through a power connector 305 to a vehicle battery 307 or to a vehicle power supply 302 through a fuse panel 303 or auxiliary port(s) 304 directly or through a voltage converter 306. The device 101 may have an optional ignition sense 308 port to know when to the device 101 on or off as to not drain its own battery 301 and/or the vehicle battery 307. The device 101, usually has a battery 301 that allows it to operate for a period or to keep it in a suspended state for a period of time without a direct connection to power. For example, nearly all smart phones today come equipped with a battery 301.

The device 101 typically connects to the vehicle's 102 power supply 302 through the vehicle's 102 fuse panel 303 or through auxiliary port(s) 304 which are typically known as automobile auxiliary power outlet, car outlet, automotive power socket, automobile outlet, or vehicular outlet. The auxiliary port(s) 304 may be with a USB connector, a plug connector, a socket connector, or other commonly used connectors. A vehicle's 102 power supply 302 voltage typically ranges from 9 v to 36 v. The device 101 may be a smart phone, a smart camera, or an embedded computer with varying power requirements. Depending on the compatibility between the device's 101 power requirements and the vehicle's 102 power supply 302 voltage, a voltage converter 306 may be required. The power load supplied by the vehicle's 102 electrical system would typically allow the device 101 to operate and charge its battery 301 simultaneously.

Depending on the configuration of the vehicle 102, when it is idle or turned off, power available to the auxiliary port(s) 304 may be shut off to protect the vehicle 102 battery from being drained. The device 101 can be connected to the vehicle 102 power through a power connector 305 with a compatible header. For example, if it is a smartphone the power connector 305 may be a USB-c, a lightning plug, or another charging cable variant. The other side of the power connector 305 may be a USB, a socket plug, a wire harness, or other connector that is aimed to connect the device 101 to the power supply 302 through the power system. The device 101 may also utilize proprietary or standard cables for power connector 305 for other device 101 variants. In the event the device 101 is an embedded computer, it may be connected directly or indirectly to the vehicle's battery 307. It may also have an ignition sense 308 interface that will communicate to the device 101 when to turn off or on as to not to drain the vehicle's battery 307.

Privacy & Security

Referring to FIG. 6, shown is a privacy/security framework 600 with capabilities, i.e. as provided by the image processing instructions 905 for the redaction (e.g. generation of discard data 19, 19') of personally identifiable information 601 such as faces 602, license plates 603, or other objects 12 containing personally identifiable information 604 such as cars or people. In certain circumstances the framework 600 has the option to redact whole image 605 other than object 12 of interest (also referred to as the resultant image data content 20), depending upon a defined privacy criteria. The framework 600 has the option to utilize unredacted images 606, with processing on device 101 and/or server 107. Secure encrypted image 606 storage 104 on the device 101 and/or server 107. Secure encrypted 606 communications to the server 107. It is recognized that the images 16 once processed (examples as processed image results 601, 602, 603, 604, 605, 606) can be referred to as the processed image portions 20 (i.e. such that the data content of the processed image content 20 does not contain the discard image data 19, 19').

For example, discard data 19, 19' can include data such as but not limited to: portions of images 16 which are being blurred; images 16 which are determined to not contain incidents 12; and/or images with incidents 12 which are being discarded due to their position (i.e. duplication in relation to an overlapping incident 12 as discussed above with respect to previous images 16 and newly acquired images 16).

As such, the image portions 20 contain less image data content than the unprocessed images themselves 16 (as acquired by the imager 500). It is the image portions 20 (the result of processed images 16 as performed by the image processing instructions 905) themselves that can be included as processed image data 20 in the object data 21 transmitted to the server 107 over the network 18, for example. It is recognised that image 16 portions can refer to inter frames (i.e. some whole frames that are retained/dropped) or intra frames (i.e. area(s) within image 16 that are retained/dropped). The privacy/security framework 600 is one example of how the data of the images 16 can be reduced (by identifying and thus extracting the discard data 19, 19') by the image processing instructions 905 before the object data 21 containing the objects 12 of interest are communicated to the server 107 or otherwise stored as processed image data 20' in the storage 30 by the server 107. It is recognized that an object 12 of interest included in the object data 21 can also be in redacted form (e.g. blurred out or pixel substituted), as such the included object 12 of interest in the resultant object data 20 can also include a reduction in its data size. It is recognised that pixel blurring can result in an increase in data size of the object data 21 (as compared to the same images 16 containing non blurred content). It is also recognised that pixel substitution/deletion can result in a decrease in data size of the object data 21 (as compared to the same images 16 containing non substituted/deleted content). Further, it is recognized that a particular image data 16 (e.g. image frame 16*a,b,c,d*—see FIG. 2) can include redaction data 19, 19' (e.g. substituted or blurred image frame portion(s)) as well as object(s) 12 of interest. Accordingly, any particular image data 16, prior to processing, can include only "to be determined" image discard data 19, 19' only "to be determined" object(s) 12 of interest, or both "to be determined" image discard data 19, 19' and "to be determined" object(s) 12 of interest. It is recognized that "to be determined" can also be referred to as "potential" or "candidate", as desired.

Considering that the system 10 is intended to be operated in the public space, and it is expected to be used extensively in public spaces and by governments and quasi-government organizations, the system 10 can have one or more privacy and security options intended address regulations regarding the collection and storage of data including personally identifiable information (pii) in the images 16. In relation to data, pii may be pictures which uniquely identify individuals. Examples of personally identifiable information include images of people's faces 602 or of a vehicles' license plate 603. It may also include house addresses. Sometimes, the objects 12 themselves may identify an individual, for example a fairly unique car or house. Governmental organizations typically have regulations and legislations related to the handling and storage of pii. Images 16 acquired by governments are also typically subject to freedom of information requests. As such, in many occasions governments do not want to store pii. Governments and organizations responsible for maintaining assets are also typically subject to litigation and claims related to incidents causing property damage, personal injury, and/or death. Images 12 which are acquired by device 101 may occasionally be used as evidence against the system user in claims. As such, some users would only wish to retain the incident 12 data, but not any other information. For example, an image 16 may report an incident 12 of a pothole, but in the image 16 peripheral there may be a broken sign 12 not detected by the system. Such image 16 can then be used as an evidence against the owner of the information in claims. The system 10 can store an acquired image 16 containing as an incident 12 as an unredacted image 606 containing all of the images' 16 original information. However, the device's 101 software 108 can have options built in to exclude pii and other non-detected related data, using the privacy/security framework 600 s discussed above.

Users opting to redact information may use the image processing instructions 905 to redact the whole image 605 (e.g. image 16) other than the detected object(s) 12 of interest. The object(s) 12 of interest can be maintained in the picture 16, whereas the remainder of the picture 16 can undergo image processing intended to redact the image 16 in order to generate the resultant processed image data 20, 20' and the discard data 19, 19'. The object(s) 12 of interest, can result in image data 20, 20' in which all image data 16 is redacted other than the object(s) 12 of interest. For example, a pothole 12 may be an object 12 of interest identified by the system 10. After the image 16 redaction process, see FIG. 9 by example implemented as system 900, the only object 12 that is not redacted in the resulting image data 20, 20' can be the pothole 12 itself.

Users may also use the image processing instructions 905 to redact pii using object redaction 604 feature aimed to redact potential objects 12 containing pii, such as vehicles, cars and people. It may also only blur objects which are pii, such as license plates 603 and faces 602. In this instance, only the pii objects 601 and/or objects containing pii 604 will be redacted (included in the discard data 19) whereas the rest of the image 16 will remain untouched and thus such content being used as the resultant processed image data 20, 20'.

The redaction operation of the image processing instructions 905 could obfuscate the details in the image 16 parts which are to be redacted (i.e. included in the discard data 19, 19'). Examples of redaction operations used to generate the discard data 19 can be pixel substitution and/or blurring. Pixel substitution is a process where pixels occupied by the object 12 of interest (whether such boundaries are semantic segmentation instances or bounding boxes) are replaced by pixels of a single color or a pattern of colors, or otherwise treated as an absence of image data 20, 20'. A blur is a visual effect function that makes the details in resultant image data 20 appear fuzzy or out of focus. The redaction operation can take place on the device 101 or on the server 107, depending on whether the first image processing portion 402 or the second processing image portion 404 is utilized (see FIG. 4) for the particular redaction operation.

Figure 4:
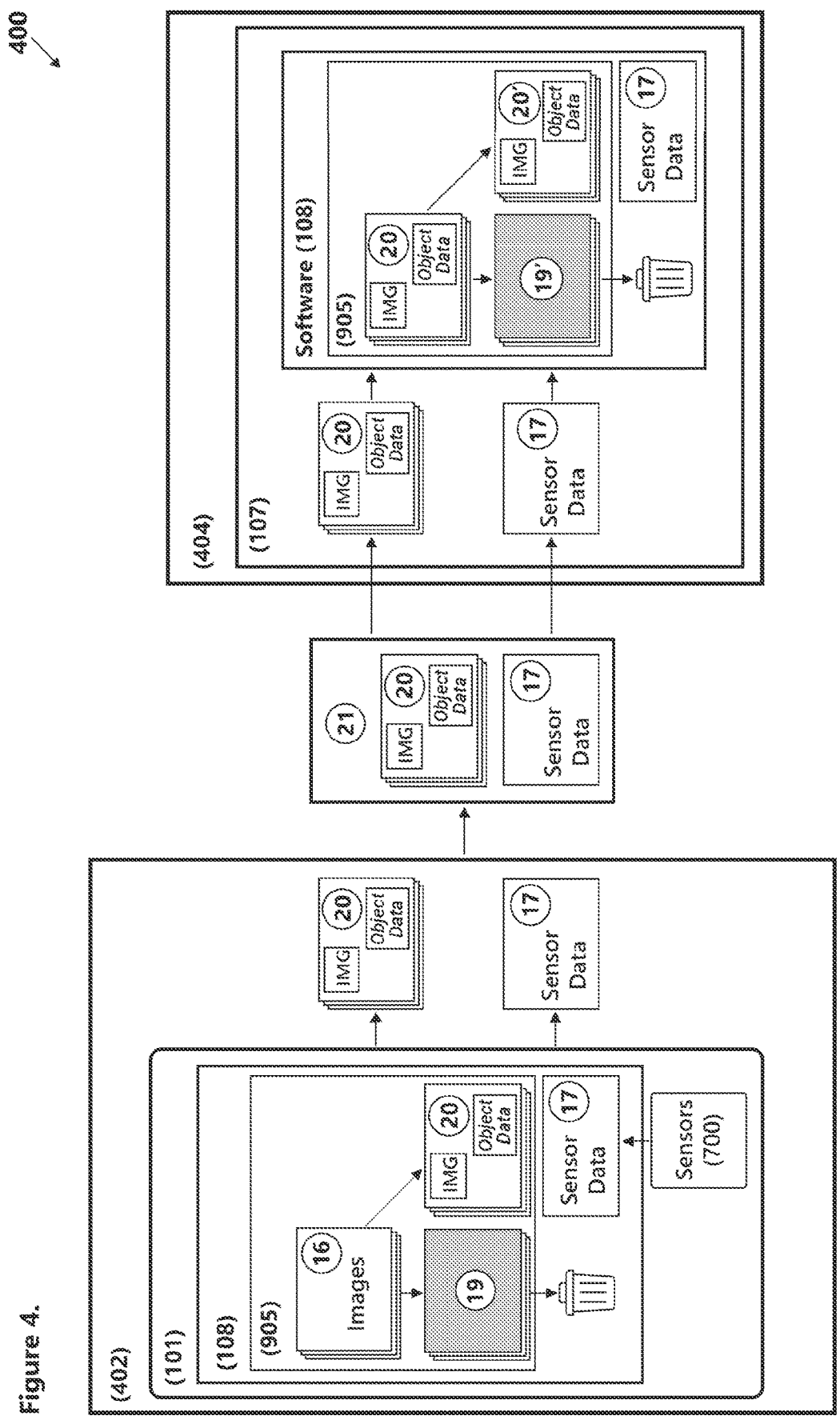
FIG. 4 shows an example split processing framework for the system of FIG. 1.

For example, referring to FIG. 4, the first image processing portion 402 can be used to generate discard data 19 (using pixel substitution) and the resultant image data 20 (that includes object(s) 12 of interest), such that the resultant image data 20 is included in the object data 21 and transmitted to the server 107. Once received, the server 107 can use a set of image processing instructions 905 to implement pixel blurring and/or additional pixel substitution, thus generating further discard data 19' as extracted from the resultant image data 20 of the object data 21. The server 107 would then store modified object data 21' in storage 30, which includes the resultant image data 20 other than the extracted discard data 19' (see FIG. 1).

In the event that the resultant images 601, 604, 605, 606 and their associated data are stored on the internal volatile memory 104, the resultant images 601, 604, 605, 606 and data may be encrypted using a modern encryption algorithm by the image processing instructions 905, which would obfuscate the files 706. Therefore, in the event that the device 101 is stolen from a vehicle 102 or lost, the information (e.g. object data 21) stored on the device 101 would not be easily accessible. Communication of the object data 21 to the server 107 may place over encrypted communications to ensure that the data is secure in transit. Finally, stored information (e.g. object data 21) may be encrypted on the server 107 to ensure that the data is secure while at rest.

Referring to FIG. 7, the device 101 can have a variety of sensors 700. In addition to camera(s) 500, the device 101 is equipped with a geo-positioning 701 sensor. The device 101 may also include an accelerometer 702 sensor, gyroscope 703 sensor, rotational vector 704 sensor, and other sensors 705 that can provide information 17 regarding the movement, position and/or orientation of the device 101 and/or the vehicle 102 on which it is equipped. The sensor(s) 700 and camera(s) 500 data 17, 16 is processed by the software 108 (including the image processing instructions 905) before being sent to the server 107, as discussed herein. The sensor data 17 and image data 16, 20 may be stored on the device 101 non volatile memory 104 in the form of file(s) 706 or database 707 entries prior to being transmitted to the server 107 as object data 21.

The device 101 includes a geo-positioning sensor 701 to determine its geo-spatial coordinates 17. Geo-location, or a geo-positioning sensor 701, provide location based information 17 using satellite (such as GPS, glonass, galileo) or cellular tower locations to determine device positioning information, which is associated with the images 16 (e.g. geo coordinates GCa, b, c, d—see FIG. 2). In addition, the device 101 in many instances will have additional sensors 700. For example, modern smartphones 101 on the market today have a variety of sensors 700 embedded right onto them, which provide information that can be used to determine the device 101 orientation, pitch, magnetic pole direction, geo-spatial position, velocity, acceleration, shock, vibration and other data 17 related to position and movement. The device 101 may include an accelerometer sensor 702 used to measure the acceleration force 17 applied to the device 101 across its x axis, y axis and z axis. The force may or may not include the force of gravity. The acceleration data 17 will typically be available as meters per second squared (m/s$^2$) though it may be in other units (for example voltage) that can be converted to such units. The device 101 may include a gyroscope sensor 703 used to measure the rate of rotation across the device's 101 x axis, y axis and z axis. The gyroscope data 17 will typically be available as radians per second (rad/s) though it may be in other units (for example voltage or frequency) that can be converted to such units. The device 101 may include a rotational vector 704 sensor used to measure the degree of rotation across the device's 101 x axis, y axis, z axis and an optional scalar product or quaternion. The rotational vector data 17 will typically be degrees, though it may be in other units (for example voltage) that can be converted to such units. The device 101 may include other sensor(s) 705 to measure a variety of other conditions 17 related to the movement, acceleration, forces applied and position of the device 101. For example, the device 101 may include a gravity sensor 700, which would measure the force of gravity 17 in relation to the device 101. Other sensor(s) 700 may also be magnetometer which can determine the device's 101 position 17 in relation to the magnetic north or true north. Other sensor(s) 705 may also include hardware and/or software monitoring of the device 101 components. Examples of sensors 700 can include battery level sensor, battery temperature sensor, cpu temperature sensor, gpu temperature sensor, ambient temperature sensor, cpu core utilization, cpu overall utilization, luminance sensor, proximity sensor, and other built in sensors available for the device 101.

Any and all of the above discussed sensor type data (i.e. sensor data 17) can then be associated with camera(s) 500 images in order to determine additional insights. For example, the sensor data 17 may be used to derive ridership experience, level of vibration, the speed in which the vehicle 102 is travelling, whether the device 101 is within a geo-zone, or the estimated geo-positioning of an object 12 detected in an image 16 in relation to the device 101. The sensor data 17 may also be used to optimize the performance of the device 101 in relation to the current heat, power and processing situation.

The sensor(s) 700 and camera(s) 500 provide for data 17, 16 to be acquired and processed by the software 108. The resultant processed data 16, 17 (e.g. using the first data processing portion 402) is then either transmitted to the server 107 or stored on the device 101 non volatile memory 104 until transmission can take place. The data 16, 17, 20 may be stored as file(s) 706 in variety of formats, such as xml, csv, txt, or in a proprietary format. The data 16, 17, 20 may also be stored in a database 707. The data 17, 20 may be stored and transmitted in encrypted on non-encrypted format.

The data 17, 20 may be further processed on the server 107 using the second data processing portion 404. For example, it may be correlated with road segments, assets, and other information to derive additional insights. For example, what roads or assets were inspected. It may also be used by the server 107 for detecting alerts related to device constraints (heat, power, or processing capabilities) on the device 101.

The GPS receiver (i.e. position sensor 701) can be used to record (sensor data 17) the location coordinates GC a, b, c, d where the incident 12 occurred so that the location of the incident 12 can be presented. GPS can also be used by the instructions 905 to determine the speed the vehicle 102 is travelling which is used to activate speed enabled features within the application (e.g. software 108 features of Screen lock, driver attention warning). In addition, the GPS data 17 can be used as breadcrumbs' to track the road surfaces 14 that have already been inspected, thus when the instructions 905 are used to compare the geo coordinates GC of the newly acquired images 16, those images 16 being determined as duplicates (i.e. having matching geo coordinates GC to previously acquired images 16) can be discarded/excluded from the object data 21. Furthermore, GPS data 17 can used by the software 108 to determine if roads 14/surroundings 13 being scanned are within a defined geofence zone, otherwise detections 12 will be ignored.

The accelerometer and magnetometer sensors 700 can be used by the software 108 to determine the vehicle's 102 direction of travel. Being able to determine when vehicle 102 direction of travel is necessary for the system 10 to present which side of the road (e.g. North, east, west or south bound lane) is being scanned by the system 10. It can also help to identify the incident 12 location in relation to the device 101 or the vehicle 102.

In view of the above, the rotational vector sensor 704 can be used to determine the device 101 orientation, including pitch, facing direction, vibration and bumps and such information 17 is sent to the server 107 together with the image data 20. Further, it is envisioned that the device 101 can keep track of rotational vector sensor 704 information 17 for the purpose of integrating the data with data obtained from images 16 for the purpose of detecting road quality and road roughness levels as determined by the level of "vibration" or "bumps" detected by the sensor 704, and such data is sent to the server 107 for the purpose of being correlated to the image data 20 uploaded.

The accelerometer 702 sensor can determine the device's 101 acceleration force along its x axis, y axis, z axis and such information 17 is sent to the server 107 together with the image data 20. The gyroscrope sensor 703 sensor can determine the device 101 orientation 17, and such information 17 is sent to the server 107 together with the image data 20. The other sensors 705 can be such as magnetometer 705 sensor to determine the device 101 orientation 17, and such information is 17 sent to the server 107 together with the image data 20. The device 101 can keep track of the location, via the sensor(s) 700, in which the device 101 was present through gps breadcrumbs or routes as evidence that the device 101 inspected the area.

Figure 8:
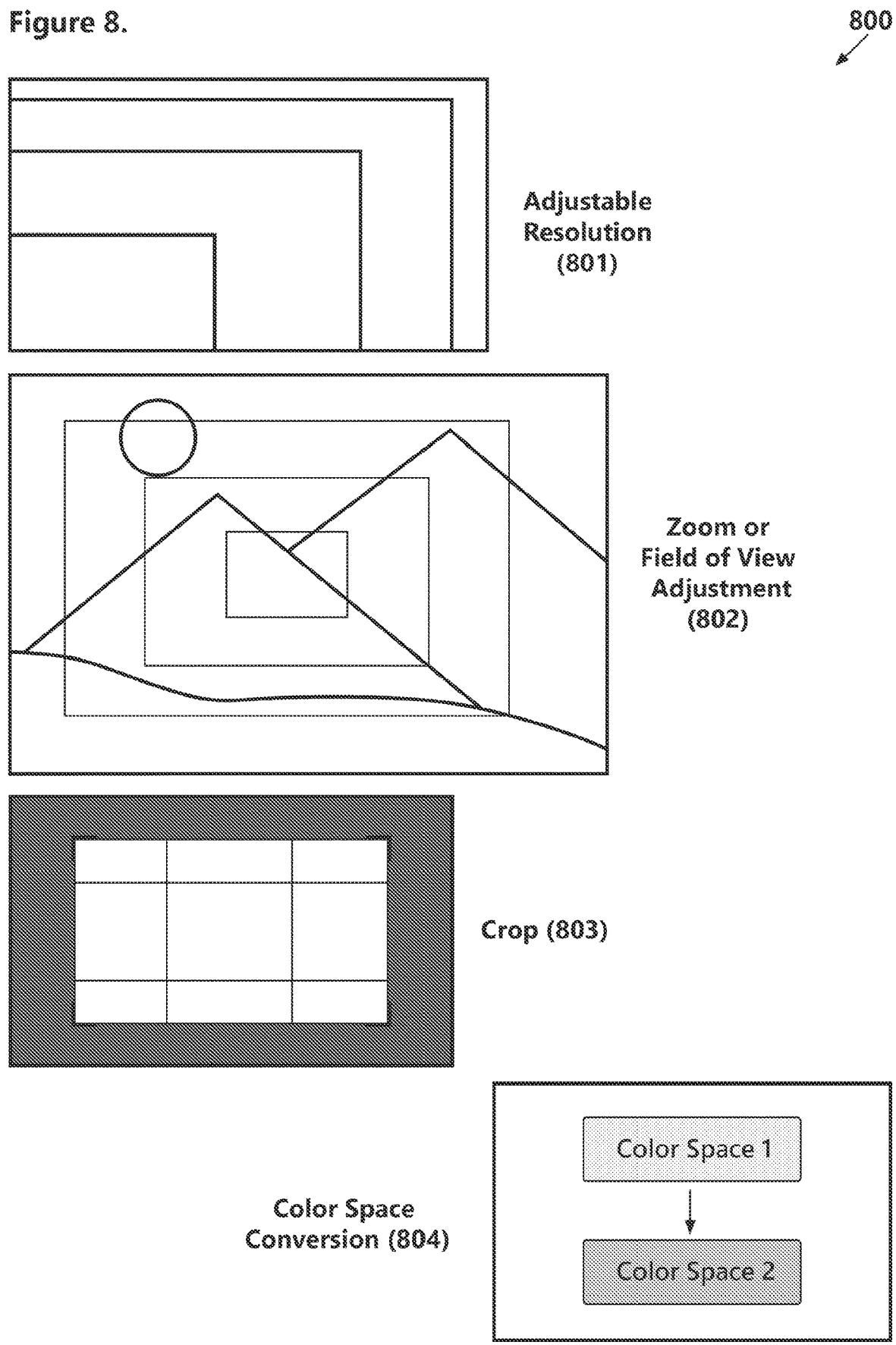
FIG. 8 shows example image processing operations of the system of FIG. 1.

Referring to FIGS. 4 and 8, one example of a distributed processing system 400 is a first image processing portion 402 for image pre-processing, which is the process of manipulating and/or adjusting the image 16 data acquired by the camera 500 to provide that the data received for neural network 905 processing is inputted in a way which will optimize the results and performance of the system 10 (i.e. optimize the quality and quantity of the resultant image data 20 in the object data 21).

For example, using the software 108, a resolution for the image 16 data can be selected from one of the camera's supported resolutions 801. The camera resolutions 801 can be represented as a name, such as 8k, 4k, 1080p, 720p, hd, or other common names. It can also be represented as a resolution, representing the number of pixels and typically in a format of width×height, for example 7680×4320, 3840× 2160, 1920×1080, 1270×720, or other resolutions. In many instances, neural networks 905 can be optimized to accept images 16 in certain resolution, typically referred to as "input shape". For example, an image 16 can be acquired by the camera 500 at a resolution of 1080p (1920 pixels×1080 pixels). However, the neural network 905 model can be trained on images 16 scaled down to the size of 300 pixels×300 pixels. The software 108 then needs to resize, or adjust the resolution 801 of the image 16 dimensions from 1920 pixels×1080 pixels to 300 pixels×300 pixels in order for the neural network 905 to process it appropriately. The neural network 905 model can have a different input shape than 300 pixels×300 pixels it may be higher (for example, 600 pixels×600 pixels) or smaller (for example, 224 pixels× 224 pixels). Typically, the larger the model "input shape" or resolution, the slower the images 16 will be processed, however the larger the "input shape" resolution is, the more details will be retained in the image 16 which may increase the model's effective detection parameters, such as accuracy, recall, precision, f-score and other such metrics.

The software 108 can also facilitate for a field of view adjustment 802, the field of view adjustment 802 can be optical zoom level adjustment, if supported by the peripheral camera 500 of an embedded computer system 101. If further magnification is required to calibrate the camera's 500 field of view, the digital zoom level can be adjusted through the software 108 to achieve the desired optimal field of view. The software 108 may also select from a variety of internal camera(s) 501 or external camera(s) 502 in order to adjust the field of view 802. Different field of view may be optimal for different use cases on vehicle(s) 102. For example, the height and pitch in which the camera 500 is mounted may be different for a bus, a service truck, or a sedan, and may require different zoom levels in order to cover the same number of lanes. Similarly, different field of views may be preferred for different objects 12. For example, signs 12 may favor a wider field of view that covers the surroundings 13 whereas road defects 12 may favor a narrower field of view covering the road surface 14.

The software 108 can also facilitate for cropping 803 parts of the image 16. Cropping the image 16 allows to omit areas which typically do not require neural network 905 processing. For example, if the camera 500 is mounted on a windshield, the top 20% of the image 16 may typically be sky, whereas the bottom 10% of the image 16 may be a dashboard or a hood of a vehicle 102. By cropping parts of the image 16 which are not relevant, those areas are less likely to generate false detections 12 or false incidents 12. In addition, in the event that the neural network 905 "input shape" is lower than the acquisition resolution, by cropping out irrelevant portions of the image 16, less detail is lost in the resizing operation of the image 16. Cropping 803 may also be used for extracting a portion of an image 16 for additional image processing and/or inference activities 905. For example, a car 102 may be detected 12 by a neural network 905 and then cropped from the image 16. The cropped car 102 may then be either redacted 604 or processed through a neural network 905 that is trained to identify license plates in a picture 16. Operations related to redaction such as personally identifiable information redaction 602, 603 object redaction 604 and/or image redaction 605 are also considered image processing operations as performed by the software 108 and related instructions 905.

In the event that the image 16 data acquired by the device's 101 camera(s) 500 is in a format that is not compatible or optimized to be used with the neural network 905 architecture or library, color space conversion 804 may be required. Examples of color spaces include yuv, rgb, hsv, hsl, cmyk and others. Even within color spaces, there are variations in the container, structure, channels, order, format, decimal system which may require conversion. For example, a file may be represented in bytes, words, or hexadecimal. Another example is that rgb channels may be ordered as bgr. Another example is that extra channel may be present to represent transparency (rgba).

Once the image data 16 is preprocessed by the first image processing portion 402 by the device 101, e.g. using image processing instructions 905, then the resultant object data 21 would be sent to the server 107 for implementation by the server 107 of image processing instructions 905 during a second image processing portion 404 by the server 107, which then results in the resultant object data 20' being stored in the storage 30 (see FIG. 1). As such, it is recognized that the device 101 can have the image processing instructions 905 as an embodiment of the system 10. As such, it is recognized that the server 107 can have the image processing instructions 905 as an embodiment of the system 10. As such, it is recognized that both the server 107 and the device 101 can have the image processing instructions 905 as an embodiment of the system 10. The device 101 and the server 107 can have different variations, configurations, and parameters relating to the image processing instructions and neural network(s) 905 used.

Referring to FIGS. 1 and 9, shown is an example of image processing system 900 implemented by the software 108 (including the image processing instructions 905) on the acquired images 16, in order to produce the processed image data 20 to be included with the object data 21 transmitted to the server 107. It is also recognized that the example of image processing system 900 implemented by the software 108 (including the image processing instructions 905) on the resultant image data 20, in order to produce the processed image data 20' to be included with the received sensor information 17 stored in the storage by the server 107.

The software 108 can include image instructions 905 (e.g. including artificial intelligence neural networks 905), for image 16 processing and inference for flexible workflows 906 inclusive of neural network(s) 905 inference operations 907 including detection 902, classification 903, and segmentation 904, in order to generate the discard data 19, 19' as well as the resultant processed image data 20, 20'. It is recognized that the workflows 906 can include a plurality of different numbers/combinations of the operations 907 in any order, as configured in the image processing instructions 905, in order to identify, classify and segment any object(s) 12 in the image(s) 16 under consideration. The system 900 also depicts processing 800 of images 16 containing object(s) 12 of interest in relation to incidents. One image 16 may have several different workflows 906 applied to it. The object(s) 12 of interest are also referred to as classes 12. The class 12 refers to one of the output categories for the object(s) 12 of interest. For example, they may include but are not limited to: pothole 12, car 12, person 12, sign 12, etc. The network(s) 905 can detect, classify, and/or segment one or more classes 12 (also referred to as object(s) 12 of interest) in the image 16.

It is recognized that the identified object(s) 12 of interest are included in the processed image data 20 while the discard data 19 is excluded from the processed image data 20, as one embodiment, such that the processed image data 20 and the sensor data 17 is transmitted to the server 107 as object data 21.

Further, it is recognized that the identified object(s) 12 of interest are included in the processed image data 20' while the discard data 19' is excluded from the processed image data 20', as one embodiment as implemented by the server 107 using the object data 21 obtained from the device 101.

Further, it is recognized that the identified object(s) 12 of interest and discard data 19 are included in unprocessed images 16 sent to the server 107 by the device 101 as the object data 21 (including the sensor data 17). Once received, then the server 107 would then process the images 16 as processed image data 20 while the discard data 19 is excluded from the processed image data 20, as one embodiment as implemented by the server 107 using the object data 21 obtained from the device 101.

Typically, image(s) 16 acquired by the device's 101 camera(s) 500 are available in some initial resolution, color space, and formatting. It is expected that in many cases, the image(s) 16 may need to undergo image processing 800 operations to optimize their compatibility with the neural networks 905 used and the object(s) 12 of interest which they are trained to identify. Some examples of image processing 800 operations are resizing or adjusting resolution 801, field of view adjustments 802, cropping 803, and/or color space conversion 804, as shown in FIG. 8 by example only.

As such, the image processing 800 operations can include the resolution of the image 16 can be set based on the available resolutions present on the camera 500 device, whether available as resolutions or as a name representative of the resolution. Further, the field of view can be adjusted via adjusting the optical zoom levels of the camera(s) 500. Further, the field of view can be adjusted by a digital zoom process, wherein the picture 16 is magnified and only the parts of the image 16 that remain within the original dimensions are processed. Further, the region of interest 12 in the image 16 can be set. Once set, the region of interest 12 will be cropped. Further, the image processing can include color space conversion, whether from one space to another, or adjusting the formatting, order and/or channels of the utilized color space.

For example, the processing instructions 905 (e.g. neural network 905) can be defined as a set of functions, operations and/or instructions which facilitates for the system 900 to train itself based on annotated datasets, commonly referred to as "ground truth". Once trained, the system 900 can then infer on new datasets. The process is known as machine learning. The neural network(s) 905 utilized in the system 900 can be primarily geared towards identifying object(s) 12 of interest in images 16 for automated incident identification and reporting. Once processed using the image processing instructions 905, the system 900 outputs the processed object data 20, shown by example in FIG. 6. Further, software 108 is configured to construct the object data 21 by associating the sensor information 17 (e.g. including geo coordinate data GC a, b, c, d) for each of the objects 12 of interest. It is recognised that during the processing of the images 16 using the image processing instructions 905, some of the image 16 data acquired will be discarded in view of the discarded image 16 data does not contain any objects 12 of interest as determined by the image processing instructions 905 as executed by the processor 111 and/or GPU 112 of the device 101 (see FIG. 7). It is recognized that discarded image 16 data can be referred to as discarded data 19 (see FIG. 4), such that discarded data 19 is not included in the object data 21 and is thus can be inhibited from being transmitted over the network 18 to the server 107.

The neural network(s) 905 utilized can have a plurality of architectures which pass the image 16 through a sequence of layers operations 907 which are aimed at aggregating, generalizing, manipulating and/or modifying the information of another layer for the purpose of inferring, detecting, classifying and/or segmenting objects 12 in images 16. Examples of some typical operations in neural network(s) 905 are: (a) convolution; (b) rectification; (c) fully connected; (d) pooling layer (e) bottleneck and/or (f) loss layer.

The architecture of the system 900 can be a neural network 905 architecture such as: (a) single shot detector (ssd), (b) you only look once (yolo), (c) convolutional neural network (cnn), (d) region-based convolutional neural network (rcnn), (e) fast region-based convolutional neural network (fast rcnn), (d) faster region-based convolutional neural network (faster rcnn), (e), mask region-based convolutional neural network (mask-rcnn), (f) region-based fully convolutional networks (r-fcn), or other published neural network 905 architectures.

When a neural network 905 is trained on an image 16 set (e.g. a series of image frames 16a,b,c,d), it can set certain parameters commonly known as weights. The parameters, or weights, are typically stored in a model file, or weights file.

The neural network 905 utilized in the system 900 can be trained using published, well known, weights files as the basis. For example, mobilenet (such as mobilenetv1, mobilenetv2, mobilenet v3), inception (such as inception v1, inception v2, inception v3), vgg, or other popular pre-trained networks, and can be composed of different number of layers (for example, resnet50, resnet101). However, the concept of such pre-trained neural networks 905 is the same whereas a base architecture with base weights is modified whereby one or more of the last or final layers is modified to detect or classify a set of objects 12 of interest, which may be identical, exclusive, partially inclusive, or fully inclusive of the original trained objects and may include new objects not present in the original neural network 905. Neural network(s) 905 may also be of a proprietary custom architecture with weights or parameters which are trained from scratch.

The neural network(s) 905 may be utilized as a detector 902, see FIG. 9. A detector 902 typically identifies an object 12 of interest in image(s) 16, and the location of the object 12. The location of the object 12 is typically in the form of a bounding box represented by coordinate(s) REFa, b, c, d and/or distance(s) in relation to a point of reference 902 in the image 16, see FIG. 2. A detector 902 may also provide a score, typically known as confidence, which represents how sure the neural network 905 is in the object 12 detection. A detector 902 may also detect landmarks. Landmarks are points of reference in a known object 12. For example, in the context of a detector identifying a sign, the bottom of the sign pole and the top of the sign pole may be landmarks. Such landmarks can then be analyzed to derive further information about the status of a sign—for example, whether it is crooked or not.

The neural network(s) 905 can be utilized as a classifier 903. A classifier 903 has a list of potential classes, or object types, which it is trained to identify in a picture. When processing image(s) 16, a classifier 903 typically returns a list of potential object(s) 12 in the image 16, sorted by the model's confidence of their presence in the image 16. The neural network(s) 905 can be utilized as a segmentor 904. A segmentor 904 typically segments image(s) 16 into regions. The regions are then typically predicted to belong to a certain class 12, or type, which allows to extract a mask, or a pixel blob, that represents the class 12. A segmentor 904 can also separate instances of the object(s) 12 into separate object(s) 12 representing one or more classes 12. For example, a segmentor 904 may identify a pothole 12, and also the shape of the pothole 12, which will allow to estimate its surface area and severity.

The neural network(s) 905 can be designed and/or optimized to be used on the device's 101 gpu, cpu or both. The workflows 906 may utilize one or more neural network(s) 905, and the neural network(s) 905 may be used in a sequence. One neural network(s) 905 can responsible for detecting 902 objects and/or regions of interest in the image(s) 16, and one or more additional neural network(s) 905 can be responsible for classifying 903 the objects 12 and/or regions of interest already detected in the image(s) 16. For example, a neural network 905 may detect 902 a pavement crack 12, crop it with image processing 800, and then another neural network 905 classifies 903 it as a longitudinal type of crack 12. It could also be used to verify that the first detection is correct. For example, the first neural network 905 may detect 902 a pothole 12, crop it using image processing 800, and pass it to a classifier 903 which confirms it is a pothole 12 and not a manhole. In some situations, this process provides the opportunity to classify 903 the object 12 of interest using a higher resolution, since the detector 902 may infer on a scaled down version of the image 16, whereas the cropped image 16 would be inferred at a higher resolution.

One neural network 905 can be responsible for detecting 902 objects 12 and/or regions 12 of interest in the image(s) 16, and one or more additional neural network(s) 905 is responsible for detecting 902 additional objects 12 and/or regions 12 of interest in the already detected area(s) of the image 16. For example, a neural network 905 detects a car 12 and then another neural network 905 detects a license plate 12 on the cars 12. One neural network 905 can be responsible for detecting 902 objects 12 and/or regions 12 of interest in the image(s) 16, and one or more additional neural network(s) 905 can be responsible for extracting landmarks 902 from the objects 12 and/or regions 12 of interest in the image 16. For example, a neural network 905 detects a pothole 12, and then another neural network 905 will identify its topmost point, bottom-most point, leftmost point, and rightmost point, and return those in a coordinate format respective to the image 16, or in a coordinate format respective to the object/region 12 of interest.

Further, the neural network inference can be processed on the Device GPU (in addition to the CPU 111 resident in the computing infrastructure 100. The neural network 905 can infer multiple classes 12 simultaneously. Further, one or more of the neural networks 905 can be simplified by approximating the neural network to floating-point numbers for the purpose of reducing the memory and processing requirements. Such reduced neural networks, sometimes known as Quantized neural networks, are then used on the Device 101 CPU 111.

As discussed, the image processing instructions 905 can include utilizing sensor data 17 to interpret/decide upon objects of interest 12 and/or discard data 19. For example, sensor data 17 (such as GPS data associated with the images 16) can be used (as configured in the image processing instructions 905) by the device 101 (and/or server 107) to discard a portion/whole image frame 16a,b,c,d from inclusion in the object data 21.

Referring to FIG. 10, shown are example inference results 1000 obtained from the image processing instructions 905 (e.g. neural network(s) 905). Neural Network(s) Inference results 1000 of a processed image 16, including bounding boxes 1002, polygons 1003, masks 1004, and landmarks 1005 as part of the resultant processed image data 20. When the system 900 is processing an image 16 through a Neural Network 905, it returns inference results in the form of data 20. The data 20 is typically a list or array of things 12 it is trained to find, typically known as classes12 and typically represented as a class id which can be correlated with a name (i.e. class 1 is person, class 2 is car, etc) and numerical score. The score typically represents the Neural Network's 905 confidence in the class 12 as identified in the image 16.

The Neural Network 905 can also provide additional information, per object 12, as to where the object 12 is found in the image 16 in the form of a Bounding Box 1002, which is typically a rectangle that is encompassing the object 12. The Bounding Box 1002 information could be provided in a variety of formats which could be used to construct a rectangle. For example, it could be two opposing coordinates (i.e. top left, bottom right) in the rectangle, or a center coordinate provided also with width and height parameters. The Neural Network 905 can also provide additional information, per object 12, as to where the object 12 is found in the image 16 in the form of a Polygon 1003, which is typically a series of connected points that are encompassing the object 12. The Polygon 1003 information could be provided in a variety of formats which could be used to construct it.

The Neural Network 905 can also provide additional information, per object 12, as to key features of the object 12 in the form of Landmarks 1005, which is typically one or more points which are expected to be present in the object 12. Landmarks 1005 could represent many things. For example, landmarks could represent lane markings 12 and edge 12 on a road. They could represent the top and the bottom of a sign post 12. They could represent the top and bottom edge of a pothole 12. Neural Network(s) 905 can learn to identify any landmark(s) 12 in any object 12. The coordinates for the Bounding Boxes 1002, Polygons 1003, and Landmarks 1005 may be absolute pixel coordinates in the image 16 (in relation to top left corner of the image), they may also be relative to another point in the image 16. The coordinates may also be provided in the form of a fraction, or percent of the image 16, which could then converted to the pixel representation.

The Neural Network 905 can also provide additional information, per object 16, as to where it is found in the image 16 in the form of a Mask 1004, which is also known as instance segmentation. The Mask 1004 information typically maps, on a pixel level, which pixels in the image belong to a specific object 12. The system 900 can identify one or more object 12 types, or classes 12, in the same image 16, using one or more Neural Network(s) 905. For example, it may identify signs 12, potholes 12, people 12 and cars 12.

Since the system 900 facilitates automated incident 12 detection in the images 16, the Neural Network(s) 905 can have the option automatically identify incidents/objects 12, including such as but not limited to:

(a) cracks, including some or all of the following crack types: longitudinal crack(s), linear crack(s), transverse crack(s), reflection crack(s), lane joint crack(s), widening crack(s), fatigue crack(s), alligator crack(s), crocodile crack(s), block crack(s), hair crack(s), edge crack(s), edge joint crack(s), slippage crack(s), and/or shrinkage crack(s). The cracks may be further differentiated by severity, such as the extent of the road to which the cracks apply and how wide the cracks are; and/or (b) deformations and/or distortions in the pavement, including some or all of the following: rutting, shoving, corrugation, depression, and/or upheaval; and/or (c) road repairs, including some or all of the following: asphalt patching, pothole patching and/or crack sealing; and/or (d) road damage, including some or all of the following: potholes, stripping or ravelling.

(e) street signage issues including some or all of the following: unreflective signs, bent signs, faded signs, obstructed signs, damaged signs, crooked sign, twisted sign, and/or vandalized sign; and/or (f) manhole issues, including some or all of the following: such as raised manhole, sunken manhole, and/or open manhole; and/or (g) drainage related issues, including some or all of the following: water pooling on pavement and clogged catch basins; and/or (h) pavement marking issues, including some or all of the following: faded markings, and unreflective lane markings; and/or (i) road obstruction issues, some or all of the following: debris on road, cadavers, and construction garbage bins/dumpsters which are obstructing the right of way; and/or (j) side walk issues, including some or all of the following: trip edges, cracks, chips, distortion and/or deformation.

In addition to identifying and reporting incidents 12 automatically, the Neural Network(s) 905 can also infer for other purposes as well, such as but not limited to:

(a) The Neural Network(s) 905 may assess environmental conditions which may affect the system functionality, including some or all of the following conditions: heavy rain, heavy fog, heavy snowfall, occluded windshield, daytime lighting conditions, night time lighting conditions, reflections on the windshield, and/or sun glare. The Device's 101 software 108 may then adjust its algorithm and parameters to optimize the system's performance under the identified environmental conditions. For example, an incident identified while the Vehicle's 102 windshield washer is in operation, the image would be discarded if the fluid spray blocked the field of view. Another example, if the road 14 is classified as completely covered in snow, pothole 12 detections would be excluded. The primary purpose of the environmental neural network 905 is to reduce erroneous incident occurrences, but it could also be used to report conditions and incidents. For example, if the road is covered in snow, it may be due the fact that the snow plows have not covered that road, which may be considered as an incident.

(b) The Neural Network(s) 905 may assess the road 14 type in order to know which type of models, workflows, algorithms or Neural Network(s) 905 to apply. For example, the road 14 may be asphalt, concrete, gravel, dirt, trail or other types of roads.

(c) The Neural Network(s) 905 may assess the road 14 conditions for the purpose of collecting road ratings for the roads which are travelled (such ratings may also be known as Pavement Condition Index). Examples of ratings may be a quantitative numerical value between 0 to 100, or a descriptive qualitative rating such as excellent rating, very good rating, good rating, fair rating, poor rating, fail rating, failed rating, failure rating, and/or other ratings descriptive of the pavement condition.

(d) The Neural Network(s) 905 may identify object(s) 12 of interest representing assets which are in a good state, whereby the absence of those objects 12 over time may be an incident. For example, street signage (which can be damaged or dislocated by high winds), traffic signals (which can be out of order), street lights (which may be burnt), lane markings (which can fade). The presence of such objects 12 could be correlated with a GIS database and ruleset to generate absence incidents. If an asset has not been detected for a certain amount of time, it gets flagged in the system. For example, this could be used to indicate that a stop sign has potentially blown down due to high winds or that a speed limit sign has been obstructed by vegetation.

(e) The Neural Network(s) 905 may identify object(s) 12 of interest representing object(s) which are to be redacted for privacy.

Referring to FIG. 11, show are example display options for a display 119 including view options such as an incident image 1101, user interface 1102, viewfinder 1107, safety mode 1103, navigation mode 1104, and a background mode allowing third party apps to run 1105. The device 101 can have a display 119 which may be integrated or external. For example, a smart phone or a smart camera 101 can have an integrated display whereas an embedded computer 101 may or may not have it, depending on its configuration. The device's 101 software 108, depending on the programming, may display different options.

The device 101 may have a user interface 1102 screen that will allow the vehicle's 102 operator to choose different options pertaining to the operation of the system 10. The user interface and its settings, options and/or menus can be accessible through a touchscreen, built in button and/or a remote control. Typically, when the device 101 is initially installed or operated in a vehicle 102, a viewfinder 1101 option will be enabled, which will allow the vehicle 102 operator to know that the device's 101 cameras 500 are aligned properly. The display 119 of the device 101 can be configured to minimize the distraction to the driver by turning off the screen or by displaying a warning message to not operate the device 101, when the vehicle 102 is in motion or even by disabling the user interface to prevent driver from interacting with the device when the vehicle 102 is travelling faster that a configurable threshold.

The display 119 can also be configured to assist the driver during operation by displaying a navigation 1104 screen. The navigation screen 1104 may show the device's 101 current position, and/or highlighted routes of roads 14 to patrol via a map interface 1104. The device's 101 software 108 may also run as a service in the background of the device 101, allowing a third party application 1105 to run on the device 101 while the software 108 is running in the background. For example, once the software 108 is started, other applications related to navigation, automated vehicle 102 location, work order management, dashcam video recorders, and other applications could be launched in the foreground. The third party applications may be launched by the software 108 and/or by the device's 101 operator.

Referring to FIG. 12, shown is an example incident/object 12 identification and reporting operation 1200. Depicted by example is Vehicle 102 equipped with a Device 101. The Device 101 identifies object(s) 12 of interest which are to be reported 1201. The Device 101 then transmits data 1202 to the Server(s) 107. The Server(s) 107 have files 1203, one or more database(s) 1204, and Software(s) 1205. The Server(s) 107 communicate with Client(s) 1208 (which may be the devices 101 or separate computing devices with a browser or software that provides access to the system 1200) which allow users to handle the incidents 12 using a user interface 1209 which may present the incidents 12 in a variety of ways including a map view 1210, list view 1211, and gallery view 1212. Object(s) 12 of interest identified and reported 1201 pertains to possible inference results (e.g. resultant processed object data 20, 20' and associated sensor data 17) as described in further detail in FIG. 10—Neural Network(s) Inference Results 1000.

Further, for example, data transmitted 1202 illustrates what typical incident data 12 contains, which can include some or all of the following:
  (a) IDs, which may include the Device 101 ID, image ID, detection ID, user ID, and/or other ID's allowing to associate the data;
  (b) Longitude: east—west position of a point on the Earth's surface. Different countries may use different names or system to describe the point;
  (c) Latitude: north—south position of a point on the Earth's surface. Different countries may use different names or system to describe the point;
  (d) Sensor(s) Data 17: described in greater detail with respect to FIG. 7—Sensors 700;
  (e) Detected Object(s) Data: described in greater detail in Neural Network(s) Inference Results 1000;
  (f) Date & Time: a date and time signature pertaining to the time and date that the incident was identified;
  (g) Image: a picture of the incident capture by the Device's 101 camera(s) 500. The image may be redacted; and/or
  (h) Other data: Other data pertains to other data that may be derived by the Device's 101 software 108 from its configuration, settings, sensor(s), database(s). For example, the direction to which the Vehicle 102 is travelling may be determined based on the Device's 101 sensors 700. Other examples of other data may include the road segment on which the incident was obtained, or the direction that the Vehicle 102 was facing, or a geo-zone in which the incident was obtained.

In view of the above, the incident data 21 is transmitted to the Server(s) 107 where it is processed by the Server(s) software(s) 1205 and organized and stored in database(s) 1204. Some data, such as uploaded incident images 20, 16 containing the incidents 12, may be stored in the form of Files 1203. The server 107 also provides for client(s) 1208 to securely log in to access a user interface 1209, which may be either a web application that can be accessed using a web browser or a client/server application that uses physical installation to a computer or a smartphone 101. Through the user interface 1209, clients can view incidents 12 detected by the device 101, which have already been uploaded to the server 107, which can be visualized in a variety of ways, such as but not limited to:
  (a) a Map View 1210 which depicts a map, along with pins representing detected incidents and known assets;
  (b) a List View 1211 which depicts a table along with fields related to each incident; and/or
  (c) a Gallery View 1212 which depicts a gallery of incidents in the form of clickable images.

Further, by example, users can click on the pins to display more information 1214 about the incident 12 such as image, details of the detection, severity, the date and time the detection occurred. Through a click of a button, the detected incidents 12 can also be presented in a gallery view layout, where a thumbnail image of each incidents can be presented in a grid.

Client(s) 1208 pertains to software that is used to access the system 10. It can typically be a web browser, but it may also be a dedicated desktop application and/or a smartphone app. The Client(s) 1208 user interface 1209 may have different views to present the data the user. For example, when selecting the incident 12 or asset for which it is related in the appropriate view, more information is displayed to the user.

The Server(s) 107 may process the information (object data 21) in a variety of ways, for example, the Server(s) 107 can also associate incidents 12, through their GPS coordinates, to a road 14 network segment, which is a representation of a segment of a road 14, which typically includes geospatial and descriptive data, such as points, features and other fields—for example the class of the road (highway, local, regional), the street name, and/or the address range which it covers. Road segments are typically extracted from a geospatial database such as a shape file, KML file, KMZ file, XML, GML and/or other such popular formats used for the modelling, transport and storage of geographic information.

The Server(s) 107 may also have an asset database, particularly for road signs, manholes, and catch basins, where the GPS coordinates, direction of travel and type of asset are logged in for every detected asset when they are detected on the Device 101. This database can be used for inventory purposes or as a list for manual inspections.

The GPS coordinates 17 and sensor information 17 of the incident 12 or asset may further processed on the server to determine additional insights, including some or all of the following:
1) Nearest address;
2) Nearest road intersection; and/or
3) Nearest major road intersection.

It is recognised that the server 107 can be a physical server connected to the internet 18. Alternatively, the server 107 is a virtual server connected to the internet 18, and whereas it may be hosted on one physical machine or on a server cluster. Alternatively, the server 107 is cloud based and connected to the internet 18.

We claim:

1. A system for collecting, processing, discarding, storing, transmitting, and disseminating data, the data includes information captured from one or more cameras and one or more sensors mounted in a vehicle, and generated object data and generated resultant data, the system comprising:
   at least one device per vehicle, the at least one device having:
      a housing;
      one or more processors for executing software instructions;
      one or more memory components;
      one or more network interfaces;
      the one or more sensors for acquiring sensor data;
      the one or more cameras for obtaining digital images;
      a mounting component for mounting the housing of the at least one device to the vehicle; and
      the software instructions, including image processing operations and related software instructions to discard image data, generate the object data and the resultant data; and
   one or more servers, communicating with the at least one device over a communications network, the at least one device mounted in one or more vehicles.

2. The system of claim 1, wherein the object data and resultant data are transmitted to a server of the one or more servers using a cellular or wireless network as the communications network.

3. The system of claim 2, wherein processing of the digital images, the object data and the resultant data is performed by the at least one device alone, by the server alone, and/or by both the server and the at least one device.

4. The system of claim 2, wherein the digital data is accessed by a user connecting to the server through the communications network using a client software.

5. The system of claim 3, wherein the sensor data is used to derive ridership experience, road quality, and/or road roughness levels.

6. The system of claim 1, wherein image processing instructions include one or more neural networks for the purpose of processing the digital images and generating the object data and the resultant data.

7. The system of claim 6, wherein the system infers, using the neural networks, for purposes other than, or in addition to, generating the object data and the resultant data.

8. The system of claim 1, wherein some or all of the cameras and/or the sensors reside externally to the housing.

9. The system of claim 1, wherein the system includes a privacy and/or security framework.

10. The system of claim 1, wherein a device installation in the vehicle using the mounting component is permanent.

11. The system of claim 3, wherein the data collected by the at least one device includes the object data and the resultant data selected from the group consisting of:
   (a) cracks, including some or all of the following crack types: longitudinal crack(s), linear crack(s), transverse crack(s), reflection crack(s), lane joint crack(s), widening crack(s), fatigue crack(s), alligator crack(s), crocodile crack(s), block crack(s), hair crack(s), edge crack(s), edge joint crack(s), slippage crack(s), and/or shrinkage crack(s);
   (b) deformations and/or distortions in the pavement, including: rutting, shoving, corrugation, depression, and/or upheaval;
   (c) road repairs, including: asphalt patching, pothole patching and/or crack sealing;
   (d) road damage, including: potholes, stripping or ravelling;
   (e) street signage issues including: unreflective signs, bent signs, faded signs, obstructed signs, damaged signs, crooked sign, twisted sign, and/or vandalized sign;
   (f) manhole issues, including: such as raised manhole, sunken manhole, and/or open manhole;
   (g) drainage related issues, including: water pooling on pavement and/or clogged catch basins;
   (h) pavement marking issues, including: faded markings, and/or unreflective lane markings;
   (i) road obstruction issues, including: debris on road, cadavers, and/or construction garbage bins/dumpsters which are obstructing the right of way; and
   (j) side walk issues, including: trip edges, cracks, chips, distortion and/or deformation.

12. The system of claim 3, wherein the system derives road ratings, such as pavement condition index, for the roads which are travelled by the at least one device.

13. The system of claim 1, wherein the at least one device is used in the vehicle of a vehicle type selected from the group consisting of:
   (a) a car;
   (b) a truck;
   (c) a golf car;
   (d) an ATV;
   (e) a bicycle;
   (f) a motorbike;
   (g) a motorcycle;
   (h) a snowmobile;
   (i) a van;
   (j) a utility vehicle;
   (k) a garbage truck;
   (l) a sweeper;
   (m) a bus;
   (n) a school bus;
   (o) a van;
   (p) a taxi; and
   (q) an autonomous vehicle.

14. The system of claim 1, wherein the data is correlated with road segments and other assets to provide additional insights.

15. The system of claim 3, wherein the system derives road ratings, such as pavement condition index, for the roads which are covered by the at least one device.

16. The system of claim 1, wherein the data is collected from a private vehicle owned by an individual.

17. The system of claim 1, wherein the at least one device includes an integrated and/or external display.

18. The system of claim 17, wherein the display provides vehicle navigation functions.

19. The system of claim 1, wherein the at least one device runs one or more separate, third party applications, concurrently with the software instructions.

20. A method for collecting, processing, discarding, storing, transmitting, and disseminating digital data, the data includes information captured from a device, a camera and a sensor mounted in a vehicle, and generated object data and generated resultant data.

* * * * *